United States Patent
Hara et al.

(10) Patent No.: US 11,852,578 B2
(45) Date of Patent: Dec. 26, 2023

(54) MICROPARTICLE MEASUREMENT SPECTROMETER, MICROPARTICLE MEASUREMENT DEVICE USING THE MICROPARTICLE MEASUREMENT SPECTROMETER, AND METHOD FOR CALIBRATING MICROPARTICLE MEASUREMENT PHOTOELECTRIC CONVERSION SYSTEM

(71) Applicant: SONY CORPORATION, Tokyo (JP)

(72) Inventors: Masaaki Hara, Tokyo (JP); Tomoyuki Umetsu, Tokyo (JP); Yoshiki Okamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 414 days.

(21) Appl. No.: 17/250,369

(22) PCT Filed: Jun. 7, 2019

(86) PCT No.: PCT/JP2019/022685
§ 371 (c)(1),
(2) Date: Jan. 12, 2021

(87) PCT Pub. No.: WO2020/017183
PCT Pub. Date: Jan. 23, 2020

(65) Prior Publication Data
US 2021/0318224 A1    Oct. 14, 2021

(30) Foreign Application Priority Data
Jul. 20, 2018    (JP) ................................ 2018-136365

(51) Int. Cl.
*G01N 15/14*    (2006.01)
*G01N 3/02*    (2006.01)
(Continued)

(52) U.S. Cl.
CPC ............ *G01N 15/1429* (2013.01); *G01J 3/02* (2013.01); *G01N 15/1012* (2013.01); *G01N 21/64* (2013.01); *G01N 2015/1006* (2013.01)

(58) Field of Classification Search
CPC ........... G01N 21/64; G01N 2021/6423; G01N 2021/6417; G01N 2015/144;
(Continued)

(56) References Cited

U.S. PATENT DOCUMENTS 9,341,562 B2 * 5/2016 Martini ................. G01N 21/255
2006/0073483 A1 * 4/2006 White ................... C12Q 1/6825
435/6.1

(Continued)

FOREIGN PATENT DOCUMENTS

| CN | 102822665 A | 12/2012 |
|---|---|---|
| EP | 2442094 A1 | 4/2012 |

(Continued)

OTHER PUBLICATIONS

International Search Report and Written Opinion of PCT Application No. PCT/JP2019/022685 dated Sep. 3, 2019, 09 pages of ISRWO.

*Primary Examiner* — John R Lee
(74) *Attorney, Agent, or Firm* — CHIP LAW GROUP

(57) ABSTRACT

To provide a technique capable of handling quantitative data in a spectrum type microparticle measurement device without causing deterioration of the SNR. The present technology provides a microparticle measurement spectrometer including a spectroscopic element that disperses light emitted from microparticles flowing through a flow path, and a photoelectric conversion array that has a plurality of light receiving elements having different detection wavelength ranges and converts optical information obtained by the light receiving elements into electrical information, in which the photoelectric conversion array has a uniform output of all (Continued)

channels when light with which the amount of light per unit wavelength becomes same is incident.

17 Claims, 12 Drawing Sheets

(51) Int. Cl.
    *G01N 15/10*     (2006.01)
    *G01J 3/02*     (2006.01)
    *G01N 21/64*     (2006.01)

(58) Field of Classification Search
    CPC ....... G01N 2015/1006; G01N 15/1436; G01N 15/1434; G01N 15/1431; G01N 15/1429; G01N 15/14; G01N 15/1012; G01N 15/10; G01J 3/0205; G01J 3/02
See application file for complete search history.

(56) References Cited

U.S. PATENT DOCUMENTS

| | | |
|---|---|---|
| 2012/0085933 A1 | 4/2012 | Doi et al. |
| 2013/0314526 A1 | 11/2013 | Yasuda et al. |
| 2021/0318224 A1* | 10/2021 | Hara ...................... G01N 21/64 |

FOREIGN PATENT DOCUMENTS

| | | |
|---|---|---|
| EP | 2637015 A1 | 9/2013 |
| JP | 2017-021045 A | 1/2017 |
| JP | 2017-026556 A | 2/2017 |
| JP | 6317526 B2 | 4/2018 |
| JP | 6326553 B2 | 5/2018 |
| WO | 2010/143367 A1 | 12/2010 |
| WO | 2012/060163 A1 | 5/2012 |
| WO | 2017/126170 A1 | 7/2017 |

* cited by examiner

MICROPARTICLE MEASUREMENT SPECTROMETER, MICROPARTICLE MEASUREMENT DEVICE USING THE MICROPARTICLE MEASUREMENT SPECTROMETER, AND METHOD FOR CALIBRATING MICROPARTICLE MEASUREMENT PHOTOELECTRIC CONVERSION SYSTEM

CROSS REFERENCE TO RELATED APPLICATIONS

This application is a U.S. National Phase of International Patent Application No. PCT/JP2019/022685 filed on Jun. 7, 2019, which claims priority benefit of Japanese Patent Application No. JP 2018-136365 filed in the Japan Patent Office on Jul. 20, 2018. Each of the above-referenced applications is hereby incorporated herein by reference in its entirety.

TECHNICAL FIELD

The present technology relates to a microparticle measurement spectrometer. More specifically, the present technology relates to a microparticle measurement spectrometer for detecting optical information from microparticles flowing in a flow path, a microparticle measurement device using the microparticle measurement spectrometer, and a method for calibrating a microparticle measurement photoelectric conversion system.

BACKGROUND ART

In recent years, with the development of analysis methods, a method has been developed in which microparticles such as biomicroparticles, e.g., cells and microorganisms, microbeads, and the like are caused to flow through a flow path, and the microparticles are individually measured and the measured microparticles are analyzed and sorted in the flowing process.

As a typical example of such a method for analyzing or sorting microparticles, technological improvement of an analysis method called flow cytometry has been rapidly progressing. The flow cytometry is an analysis method in which microparticles to be analyzed are poured into a fluid in an aligned state and the microparticles are irradiated with laser light or the like, and fluorescence or scattered light emitted from each microparticle is detected to analyze and sort the microparticles.

In the analysis of microparticles represented by flow cytometry or the like, an optical method is often used in which the microparticles to be analyzed are irradiated with light such as a laser and fluorescence or scattered light emitted from the microparticles is detected. Then, on the basis of the detected optical information, a histogram is extracted by an analysis computer and software, and analysis is performed.

On the basis of demands of basic medicine and clinical fields in recent years, there has been an increasing number of flow cytometers capable of multicolor analysis using multiple fluorescent dyes. However, in multicolor analysis using a plurality of fluorescent dyes in one measurement, light from a fluorescent dye other than the intended one can leak into each photoelectric converter, resulting in a decrease in analysis accuracy. Therefore, in the conventional microparticle analysis, fluorescence correction is performed in order to extract only target optical information from a target fluorescent dye, but in the case of fluorescent dyes having close spectra, a problem that fluorescence correction cannot be performed well because leakage into the photoelectric converter becomes large can occur.

In order to solve this problem, a microparticle analysis method of a type in which the spectrum of a phosphor is acquired and analyzed has been developed. For example, in a spectral type flow cytometer, the fluorescence amount of each microparticle is analyzed by performing fluorescence separation using the spectral information of a fluorescent dye used for dyeing on a fluorescence signal measured from microparticles. This spectral type flow cytometer includes an array type photoelectric converter for detecting the spectrum, instead of the photoelectric converter arranged in as many as the number of fluorescent dyes in the conventional flow cytometer.

In a PMT array, which is an example of the array type photoelectric converter mounted on the spectral type flow cytometer, the process in which a high voltage is applied to an electrode called a dynode to multiply electrons is performed in multiple stages such that a 1E+7 times multiplied gain can be obtained. In order to adjust the independent gain of each channel, a voltage applied to a certain dynode can be set independently for each channel. However, since the change in gain and the position of the extreme value according to a setting value vary with each channel and total gain, it is necessary to practically measure and adjust the characteristics in order to master the independent gain, and it has not been effectively used.

There is a variation in photoelectric conversion gain between channels of the PMT array. The uniformity data that differs for each PMT array is provided by being described in a product test report and the like. Therefore, it is thought that the variation between CHs can be corrected by using the channels such that the measured PMT output voltage is, for example, multiplied by 1.0 for channels with 100% uniformity and multiplied by 2.5 for channels with 40% uniformity. However, the uniformity data of each product is a value under different measurement conditions than when it is incorporated and used in a measuring device such as a flow cytometer and the like and is not a value in the wavelength range that each channel is responsible, and therefore an error occurs and it is not possible to reuse the reference spectrum merely by performing such correction.

In order to solve this problem, for example, Patent Document 1 discloses a microparticle measurement device including a detection unit that detects light from microparticles and an information processing unit that corrects a value detected by the detection unit with a sensitivity correction coefficient to generate spectrum data, in which the sensitivity correction coefficient is specified on the basis of a value detected by the detection unit regarding light from a fluorescent reference particle that emits fluorescence in a predetermined wavelength range width. By using the technique described in Patent Document 1, the correction coefficient of each channel can be determined so that the reference spectrum can be reused.

Furthermore, Patent Document 2 discloses a microparticle measurement device including a detection unit that detects light from fluorescent reference particles that emit fluorescence in a predetermined wavelength range width, and an information processing unit that specifies a relationship between an applied voltage coefficient corresponding to a feature amount of a predetermined output pulse and a control signal of the detection unit on the basis of a feature amount of an output pulse detected by the detection unit and a control signal of the detection unit at the time of detection of the feature amount of the output pulse, in which the feature amount of the output pulse is a value depending on the control signal of the detection unit. By using the technique described in Patent Document 2, the gain can be set so that compatible measurement results can be obtained among a plurality of FCMs.

CITATION LIST

Patent Document

Patent Document 1: Japanese Patent Application Laid-Open No. 2017-026556
Patent Document 2: WO2017/126170A1

SUMMARY OF THE INVENTION

Problems to be Solved by the Invention

As described above, in the spectrum type microparticle measurement device, a technology has been developed in which at the time of quality control (QC) performed before the actual measurement, fluorescent reference particles that emit fluorescence in a predetermined wavelength range width are caused to flow through a flow path, and, on the basis of the optical information obtained from the fluorescent reference particles, correction coefficients of each channel are specified. However, the problems described below remain in such methods.

First, it is desirable to increase the total gain of the PMT in the range where an electric circuit in the subsequent stage is not saturated, but the method of the prior art can only increase the total gain as much as possible in the range where the output of any channel is not saturated. Therefore, there has been a problem that the SNR of a channel having a small output deteriorates and adversely affects the measurement and analysis results.

Furthermore, although the method of the prior art is considered so that the same reference spectrum is always obtained, since the wavelength characteristics of a light source, a spectroscope, and a PMT photoelectric conversion film are not considered, the same spectrum shape as a phosphor is not obtained and there has been a problem that the quantitativity of the measured data is lost.

Thus, a main object of the present technology is to provide a technique capable of handling quantitative data in a spectrum type microparticle measurement device without causing deterioration of the SNR.

Solutions to Problems

That is, the present technology, first, provides a microparticle measurement spectrometer including: a spectroscopic element that disperses light emitted from microparticles flowing through a flow path; and a photoelectric conversion array that has a plurality of light receiving elements having different detection wavelength ranges and converts optical information obtained by the light receiving elements into electrical information, in which the photoelectric conversion array has a uniform output of all channels when light with which the amount of light per unit wavelength becomes same is incident.

The photoelectric conversion array of the microparticle measurement spectrometer according to the present technology can calibrate an independent gain of each channel so that a photoelectric conversion gain of a channel by which a photoelectric conversion gain becomes minimum is equivalent to a photoelectric conversion gain of another channel among all channels when an independent gain is set to the same value in a state where a total gain is set to an arbitrary value.

In this case, the photoelectric conversion array can calibrate an independent gain of each channel with respect to each setting value of the total gain. Furthermore, the photoelectric conversion array of the microparticle measurement spectrometer according to the present technology can adjust the independent gain of each channel on the basis of optical information from fluorescent reference particles emitting fluorescence of a predetermined wavelength range width flowing through a flow path.

Moreover, the photoelectric conversion array of the microparticle measurement spectrometer according to the present technology can adjust the output value of each channel by a correction coefficient on the basis of optical information from fluorescent reference particles emitting fluorescence of a predetermined wavelength range width flowing through a flow path.

In addition, the photoelectric conversion array of the microparticle measurement spectrometer according to the present technology can also adjust the independent gain of each channel on the basis of optical information from microparticles to be measured flowing through a flow path.

The microparticle measurement spectrometer according to the present technology can include, apart from the photoelectric conversion array: a photoelectric conversion unit that includes a light receiving element and converts optical information obtained by the light receiving element to electrical information, in which outputs of all channels of the photoelectric conversion array and an output of a channel of the photoelectric conversion unit can be uniform when light with which the amount of light per unit wavelength becomes the same is incident.

The microparticle measurement spectrometer according to the present technology can include a plurality of the photoelectric conversion units.

In this case, outputs of all channels of all photoelectric conversion arrays can be uniform when light with which the amount of light per unit wavelength becomes the same is incident.

The present technology next provides a microparticle measurement device, including: a microparticle measurement spectrometer including: a spectroscopic element that disperses light emitted from microparticles flowing through a flow path, and a photoelectric conversion array that has a plurality of light receiving elements having different detection wavelength ranges and converts optical information obtained by the light receiving elements into electrical information,
    in which the photoelectric conversion array has a uniform output of all channels when light with which the amount of light per unit wavelength becomes same is incident.

The present technology moreover provides a method for calibrating a microparticle measurement photoelectric conversion system, the method including: receiving light emitted from microparticles flowing through a flow path with a plurality of light receiving elements having different detection wavelength ranges; and converting optical information obtained by the light receiving elements into electrical information, in which outputs of all channels are uniform when light with which the amount of light per unit wavelength becomes same is incident.

The calibration method according to the present technology can calibrate a total gain of the microparticle measurement photoelectric conversion system and an independent gain of each channel to obtain the same measurement result as a microparticle measurement reference device, which is a reference.

The calibration method according to the present technology can calibrate a total gain of the microparticle measurement photoelectric conversion array and an independent gain of each channel to obtain the same measurement result as a microparticle measurement photoelectric conversion reference array, which is a reference, in a case of a microparticle measurement photoelectric conversion system having two or more microparticle measurement photoelectric conversion reference arrays.

As the microparticle measurement photoelectric conversion reference array in this case, it is possible to select a microparticle measurement photoelectric conversion array having the minimum variation in characteristics between channels among all microparticle measurement photoelectric conversion arrays.

The calibration method according to the present technology can perform a reference array calibration process of calibrating an independent gain of each channel so that outputs of all channels are uniform when the light with which the amount of light per unit wavelength becomes the same is incident regarding the microparticle measurement photoelectric conversion reference array; and an independent gain setting process of setting an independent gain of each channel of a microparticle measurement photoelectric conversion array to be calibrated according to an independent gain of each channel after calibration of the microparticle measurement photoelectric conversion reference array.

The calibration method according to the present technology can further perform an adjustment process of adjusting an output value of each channel using a correction coefficient on the basis of optical information from fluorescent reference particles emitting fluorescence of a predetermined wavelength range width flowing through a flow path.

In the present technology, "microparticles" broadly include biologically relevant microparticles such as cells, microorganisms, liposomes and the like, or synthetic particles such as latex particles, gel particles, industrial particles and the like.

The biologically relevant microparticles include chromosomes, liposomes, mitochondria, organelles and the like that constitute various cells. The cells include animal cells (such as blood cell lineage cells) and plant cells. The microorganisms include bacteria such as *Escherichia coli*, viruses such as tobacco mosaic virus, fungi such as yeast, and the like. Moreover, the biologically relevant microparticles can also include biologically relevant macromolecules such as nucleic acids, proteins, and complexes thereof.

Furthermore, the industrial particles may be, for example, an organic or inorganic polymer material, metal, or the like. The organic polymer material includes polystyrene, styrene-divinylbenzene, polymethylmethacrylate and the like. The inorganic polymer material includes glass, silica, magnetic materials and the like. The metal includes colloidal gold, aluminium and the like. The shape of these microparticles is generally normally spherical, but may be non-spherical, and the size, mass and the like are not particularly limited.

MODE FOR CARRYING OUT THE INVENTION

Figure 1:
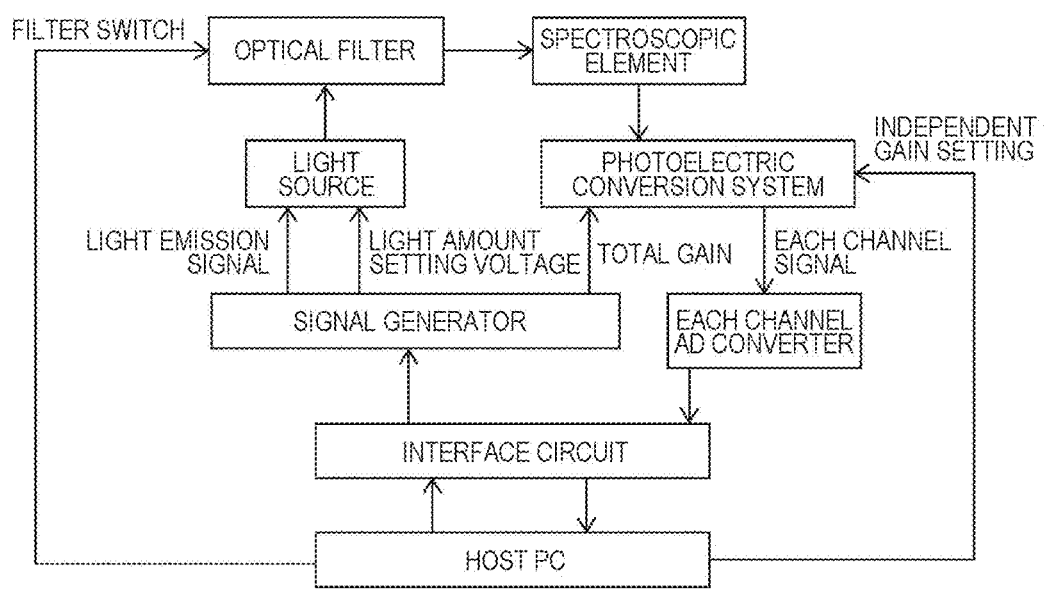
FIG. 1 is a conceptual diagram showing a configuration example of an entire calibration system used when calibrating a microparticle measurement photoelectric conversion system.

Hereinafter, a preferred mode for carrying out the present technology will be described with reference to the drawings. Embodiments described below indicate an example of representative embodiments of the present technology, and they do not make the scope of the present technology to be understood narrowly. Note that description will be presented in the following order.

1. Method for calibrating the microparticle measurement photoelectric conversion system (first embodiment)
   (1) Configuration example of the calibration system
   (2) Calibration method according to the first embodiment
   (2-1) Advance preparation
   (2-2) Minimum channel determination process I
   (2-3) Independent gain adjustment process II
2. Microparticle measurement spectrometer 1
   (1) Spectroscopic element 11
   (2) Photoelectric conversion array 12
   (3) Photoelectric conversion unit 13
3. Microparticle measurement device 2
   (1) Flow path P
   (2) Light irradiation unit 21
   (3) Light detection unit 22
   (4) Processing unit 23
   (5) Storage unit 24
   (6) Display unit 25
   (7) Sorting unit 26
4. Method for calibrating the microparticle measurement photoelectric conversion system (second to fourth embodiments)
   (1) Calibration method according to the second embodiment
   (2) Calibration method according to the third embodiment
   (3) Calibration method according to the fourth embodiment <1. Method for Calibrating the Microparticle Measurement Photoelectric Conversion System (First Embodiment)>

Figure 2:
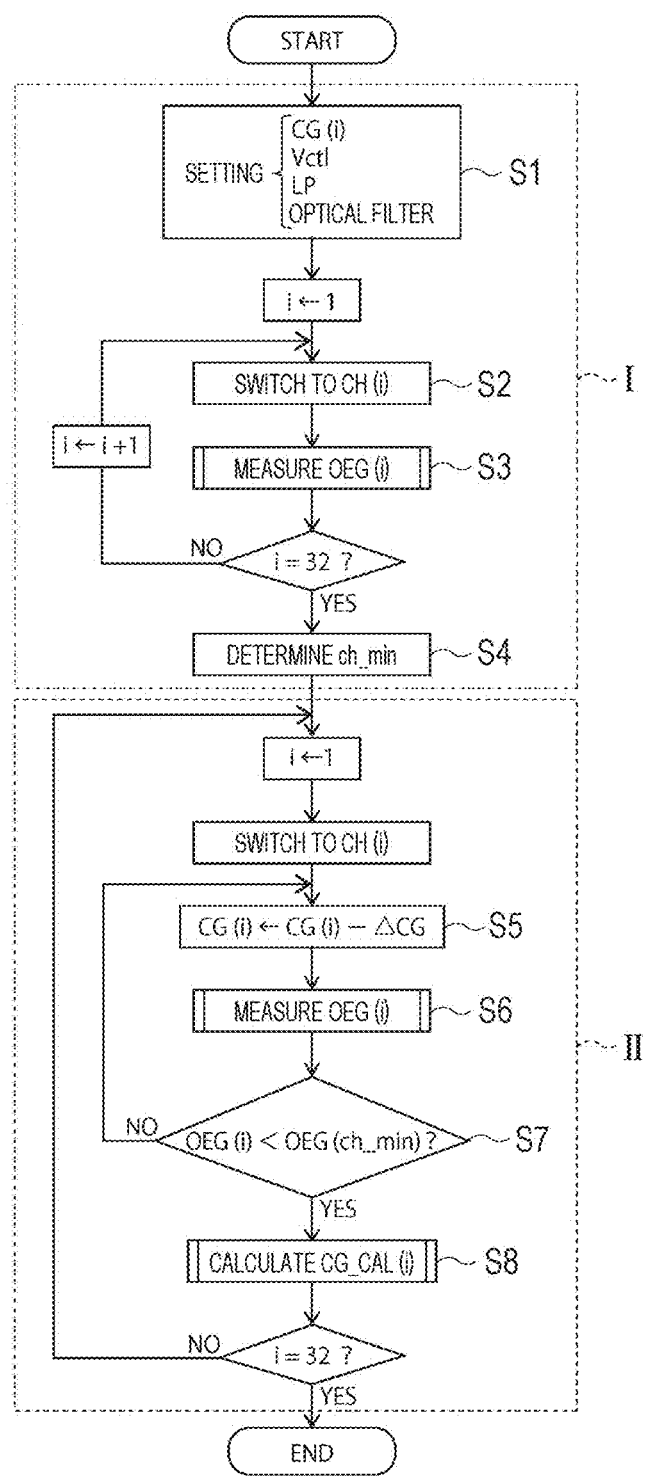
FIG. 2 is a flowchart showing a first embodiment of a method for calibrating a microparticle measurement photoelectric conversion system according to the present technology.

The method for calibrating a microparticle measurement photoelectric conversion system according to the present technology is a method for calibrating a microparticle measurement photoelectric conversion system, in which light emitted from microparticles flowing in a flow path is received with a plurality of light receiving elements having different detection wavelength ranges and optical information obtained by the light receiving element is converted into electrical information, characterized in that the output of all channels is made uniform when light with which the amount of light per unit wavelength becomes the same is incident. Description is given below of a specific example in which a microparticle measurement photoelectric conversion system is calibrated so that the output of all channels becomes uniform when light with which the amount of light per unit wavelength becomes the same is incident in conjunction with FIGS. 1 and 2. FIG. 1 is a conceptual diagram showing a configuration example of an entire calibration system used when calibrating a microparticle measurement photoelectric conversion system. FIG. 2 is a flowchart showing a first embodiment of a method for calibrating a microparticle measurement photoelectric conversion system according to the present technology. Note that the flowchart of FIG. 2 shows an example in which the number of channels of the microparticle measurement photoelectric conversion system is 32.

(1) Configuration Example of the Calibration System

The calibration system used when calibrating the microparticle measurement photoelectric conversion system roughly includes a host PC, a light source, a spectroscopic element, and a photoelectric conversion system. The host PC sends a control signal to a signal generator via an interface circuit (for example, PCI-Express and the like), and the signal generator outputs a light amount setting voltage and a light emission signal to the light source (for example, an LED light source and the like). The light emission signal at this time is preferably a pulse signal because a larger voltage can be applied. Light is emitted to various optical filters from the light source to which the light amount setting voltage and the light emission signal are input. At this time, for example, by using a neutral density (ND) filter, the amount of light from the light source can be attenuated to an appropriate magnitude incident on the photoelectric conversion system. The amount of light from the light source can be changed by the light amount setting voltage, but it is desirable to keep the light amount setting voltage constant because it is important to emit light with a stable amount of light over a wide range of wavelengths. On the other hand, in the photoelectric conversion system, when the gain set with respect to the incident light amount is excessively large, the output is saturated and correct measurement cannot be performed. Therefore, for example, it is desirable to adjust the incident light amount using the ND filter. Various optical filters such as the ND filter may be subjected to manual switching operations and the like, but it is desirable to use one that can be switched from the host PC using a USB terminal or the like.

In the photoelectric conversion system described later, the optical filter such as the ND filter may be set so that the optical filter can be switched for each channel so that the largest possible output can be obtained in a non-saturating range. In that case, the attenuation amount and the like of the optical filter to be used is measured in advance for each channel, and is used in the calculation of the incident light amount (RCP(i)) of each channel in the advance preparation of the calibration method described later.

The light appropriately controlled by the various optical filters is dispersed for each wavelength by the spectroscopic element and incident on the light receiving element of each channel of the photoelectric conversion system. The light incident on each channel is converted into electrical information by a photoelectric conversion element such as a photoelectric conversion film, furthermore multiplied by a predetermined multiplication factor, and output from the photoelectric conversion system. At this time, the multiplied gain of the photoelectric conversion system can be determined by a combination of the total gain controlled by giving a control voltage (Vctl) from the signal generator in an analog manner and the independent gain set by digital data from the host PC using, for example, a USB interface or the like.

The output signal from each channel of the photoelectric conversion system is converted into a digital signal by an AD converter for each channel, and is taken into the host PC via the interface circuit (for example, PCI-Express). The outputs of the channels do not necessarily have to be AD-converted simultaneously, but, for example, can be taken into the host PC in a time-division manner by using the AD converter and an input switching circuit for four channels.

(2) Calibration Method According to the First Embodiment

The calibration method according to the first embodiment is roughly divided into two parts: a minimum channel determination process for searching for a channel by which the photoelectric conversion gain becomes the minimum and an independent gain adjustment process of adjusting an independent gain of each channel so that the photoelectric conversion gains of all the channels match the photoelectric conversion gain of the minimum channel (hereinafter, also referred to as the "minimum photoelectric conversion gain"). Hereinafter, each process will be described in detail.

(2-1) Advance Preparation

First, as an advance preparation of each process, the incident light amount (RCP(i)) of each channel is calculated. Specifically, first, the amount of light (LPW(i)) at the center wavelength of each channel obtained by combining the relationship between each channel and the wavelength and the wavelength characteristics of the light source to be used is calculated. Next, the calculated light amount (LPW(i)) of each channel is multiplied by the wavelength width (WID (i)) of each channel to calculate the incident light amount (RCP(i)) of each channel.

(2-2) Minimum Channel Determination Process I

In the minimum channel determination process I, first, all the independent gains (channel gain (CG(i))) of the channels are set to the maximum value, a control voltage (Vctl) that determines the total gain is practically set to a value used for measurement of microparticles, a light amount setting voltage (light power (LP)) of the light source to be used is given, and the optical filter is set (FIG. 2, reference numeral S1). Note that this amount of light is preferably set so that as large an output voltage as possible can be obtained within a non-saturating range when an appropriate optical filter (for example, a neutral density (ND) filter) is selected.

Next, the photoelectric conversion gain (optical to electric gain (OEG(i))) of each channel is measured. Specifically, in a state of being switched to the channel to be measured (FIG. 2, reference numeral S2), the light is emitted from the light source, the output from the channel to be measured is AD-converted, and the amplitude of a pulse emitting portion is subjected to average processing to obtain an output voltage (V(i)). From the obtained output voltage (V(i)), the photoelectric conversion gain (OEG(i)) is calculated using the formula (OEG(i)=V(i)/RCP(i)) (FIG. 2, reference numeral S3). This is repeated for the number of channels, and a channel (ch_min) by which the photoelectric conversion gain becomes the minimum is determined on the basis of the photoelectric conversion gain (OEG(i)) of each channel obtained (FIG. 2, reference numeral S4).

(2-3) Independent Gain Adjustment Process II

The independent gain adjustment process II is a process of adjusting an independent gain of each channel so that the photoelectric conversion gains of all the channels match the gain of the channel (ch_min) by which the photoelectric conversion gain becomes the minimum (minimum photoelectric conversion gain (OEG (ch_min))).

Specifically, first, in a state where the independent gain (CG(i)) of each channel is reduced by a predefined arbitrary value ($\Delta$CG) (FIG. 2, reference numeral S5), by a method similar to the minimum channel determination process I, the output voltage (V(i)) of each channel is obtained, and the photoelectric conversion gain (OEG(i)) is calculated (FIG. 2, reference numeral S6). The calculated photoelectric conversion gain (OEG(i)) of each channel is compared with the minimum photoelectric conversion gain (OEG(ch_min)) (FIG. 2, reference numeral S7), and when the photoelectric conversion gain (OEG(i)) is equal to or larger than the minimum photoelectric conversion gain (OEG(ch_min)), the independent gain (CG(i)) is further reduced by $\Delta$CG, and the photoelectric conversion gain is measured again. This is repeated until the photoelectric conversion gain (OEG(i)) becomes smaller than the minimum photoelectric conversion gain (OEG(ch_min)), and when it becomes smaller, it is compared with the value of the previous photoelectric conversion gain (OEG(i)), and the independent gain that reduces the difference from the minimum photoelectric conversion gain (OEG(ch_min)) is defined as an independent gain calibration value (CG_CAL(i)) (FIG. 2, reference numeral S8). This is repeated for the number of channels to adjust the independent gain of each channel.

Note that, in the present embodiment, description is given assuming $\Delta$CG=1. However, because when the value is reduced by one, it takes time until the photoelectric conversion gain (OEG(i)) becomes smaller than the minimum photoelectric conversion gain (OEG(ch_min)), it is possible to devise various ways for quick convergence. For example, it is possible to set $\Delta$CG=8 and make a reduction by eight to measure the photoelectric conversion gain (OEG(i)) until the photoelectric conversion gain (OEG(i)) becomes smaller than the minimum photoelectric conversion gain (OEG (ch_min)), then the independent gain (CG) can be increased by one and the photoelectric conversion gain (OEG(i)) can be measured until the photoelectric conversion gain (OEG (i)) becomes equal to or larger than the minimum photoelectric conversion gain (OEG(ch_min)), and a comparison can be made with the value of the previous photoelectric conversion gain (OEG(i)) so that the independent gain that minimizes the difference from the minimum photoelectric conversion gain (OEG(ch_min)) can be defined as an independent gain setting value (CG_CAL(i)).

In the above description, the control voltage (Vctl) that determines the total gain total gain is set to a certain value, and the independent gain of each channel is calibrated. However, for each of the total gains that can be used, a table may be created by obtaining the calibration value of the independent gain, and the independent gain may be set again every time the total gain is set.

The above calibration method is a method performed in the stage before actual measurement of microparticles. That is, it can be performed at the time of factory shipment, at the time of delivery to the user, at the time of installation in the microparticle measurement device, before quality control (QC), and the like.

<2. Microparticle Measurement Spectrometer 1>

Figure 3:
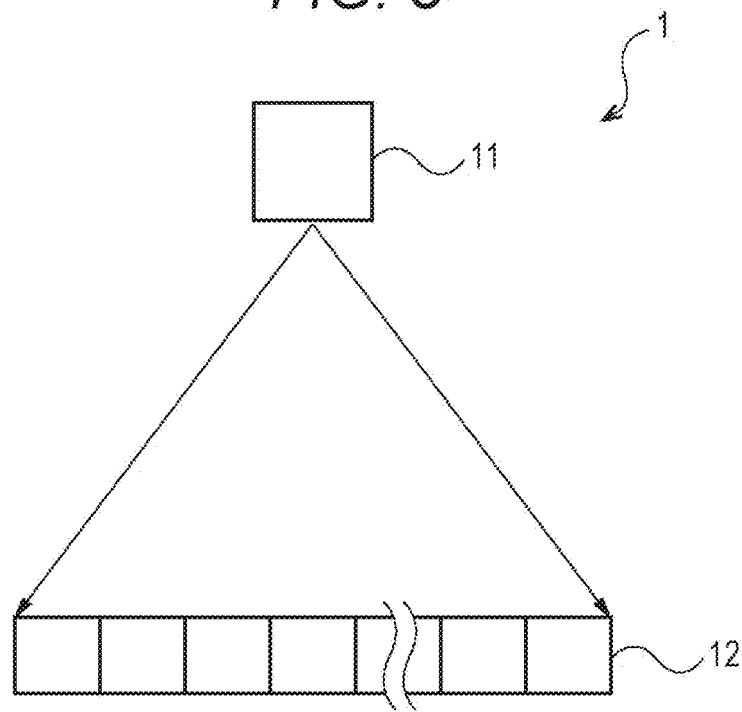
FIG. 3 is a conceptual diagram showing a first embodiment of a microparticle measurement spectrometer 1 according to the present technology.

FIG. 3 is a conceptual diagram showing the first embodiment of the microparticle measurement spectrometer 1 according to the present technology. The microparticle measurement spectrometer 1 according to the present technology at least includes the spectroscopic element 11 and the photoelectric conversion array 12. Hereinafter, each unit will be described in detail.

(1) Spectroscopic Element 11

The spectroscopic element 11 of the microparticle measurement spectrometer 1 according to the present technology disperses the light emitted from the microparticles flowing through a flow path P, which will be described later. The spectroscopic element 11 that can be used in the microparticle measurement spectrometer 1 according to the present technology is not particularly limited as long as the effect of the present technology is not impaired, and a spectroscopic element that can be used in a known spectrometer can be freely adopted. For example, a diffraction grating such as a prism, a grating mirror, or the like can be mentioned.

(2) Photoelectric Conversion Array 12

The photoelectric conversion array 12 of the microparticle measurement spectrometer 1 according to the present technology has a plurality of light receiving elements 121 having different detection wavelength ranges, and converts the optical information obtained by the light receiving elements 121 into electrical information. The light receiving element 121 that can be used in the microparticle measurement spectrometer 1 according to the present technology is not particularly limited as long as the effect of the present technology is not impaired, and a light receiving element that can be used in a known spectrometer can be freely adopted. For example, a photo multiplier tube array (PMT), a photodiode (PD), an avalanche photodiode (APD), a CMOS image sensor (CIS), and the like can be mentioned.

In the photoelectric conversion array 12, the light from the microparticles dispersed by the spectroscopic element 11 is received by the plurality of light receiving elements, and the received optical information is converted into electrical information. More specifically, the received optical information is converted into electrical information using a photoelectric conversion element such as a photoelectric conversion film, and this electrical information is multiplied by a predetermined multiplication factor to double the electrical information. The doubled electrical information is converted and output according to an output scheme using, for example, a current-voltage conversion element or the like.

The photoelectric conversion array 12 of the microparticle measurement spectrometer 1 according to the present technology has the feature that the outputs of all channels are uniform when light with which the amount of light per unit wavelength becomes the same is incident. By having such a feature, the microparticle measurement spectrometer 1 according to the present technology can prevent deterioration of the SNR due to an individual difference of channels and enable quantitative measurement.

In the photoelectric conversion array 12 of the microparticle measurement spectrometer 1 according to the first embodiment, in order to make the outputs of all channels uniform when light with which the amount of light per unit wavelength becomes the same is incident, the method for calibrating the independent gain of each channel can use the first embodiment of the method for calibrating the microparticle measurement photoelectric conversion system according to the present technology described above.

(3) Photoelectric Conversion Unit 13

Figure 4:
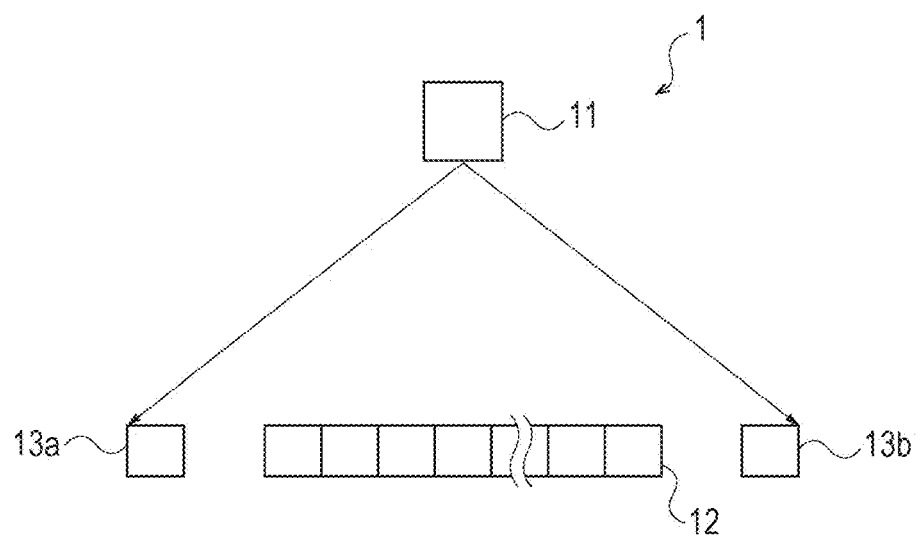
FIG. 4 is a conceptual diagram showing a second embodiment of a microparticle measurement spectrometer 1 according to the present technology.

FIG. 4 is a conceptual diagram showing the second embodiment of the microparticle measurement spectrometer 1 according to the present technology. The microparticle measurement spectrometer 1 according to the present technology may include one or a plurality of photoelectric conversion units 13 (13a, 13b) apart from the photoelectric conversion array 12 where necessary.

Figure 5:
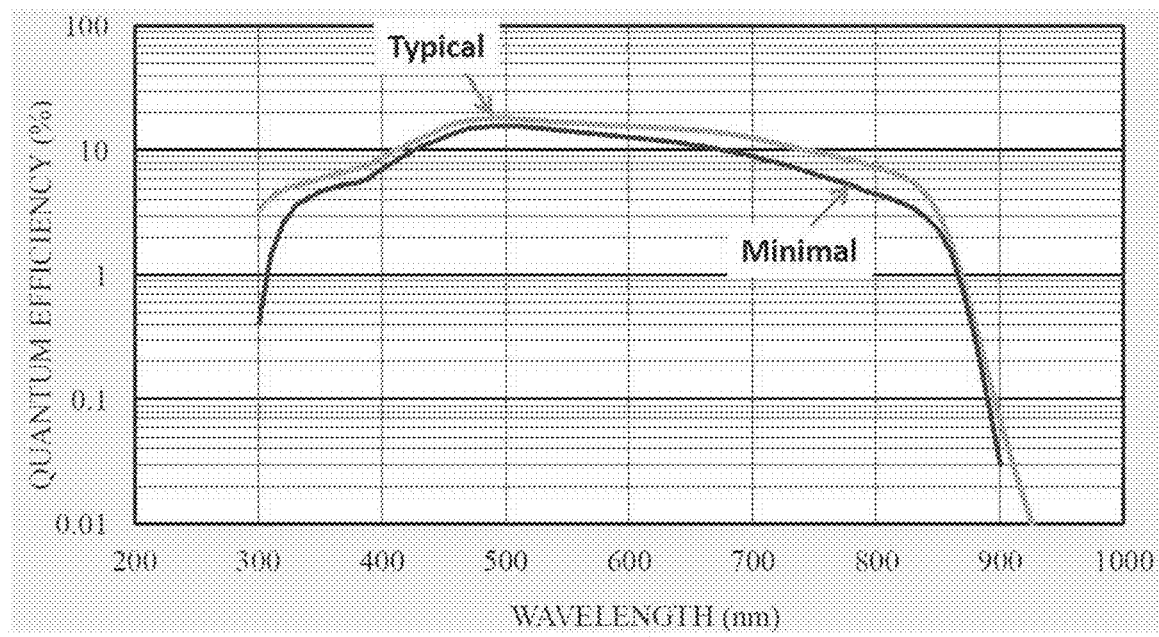
FIG. 5 is a drawing-substitute graph showing an example of wavelength characteristics of quantum efficiency of a photoelectric conversion film that can be used in a photoelectric conversion array 12 for microparticle measurement.

There are various types of photoelectric conversion elements used in the photoelectric conversion array 12 for microparticle measurement, some of which have high quantum efficiency in the visible region, and some of which have high quantum efficiency in the short wavelength ultraviolet region or long wavelength infrared region. However, in a case of manufacturing the photoelectric conversion array 12 for microparticle measurement, it is difficult to use different photoelectric conversion elements for each wavelength that each channel is responsible or to use a photoelectric conversion element whose composition changes continuously. Therefore, a photoelectric conversion element such as a photoelectric conversion film that can detect fluorescence in the widest possible wavelength range in the visible region as shown in FIG. 5 is often used. In this case, for example, in order to meet the demand for using a phosphor that emits light in the ultraviolet region of 400 nm or less and the infrared region of 800 nm or more, the microparticle measurement spectrometer 1 according to the present technology can use the plurality of photoelectric conversion units 13 (13a, 13b) such as a single PMT specialized for such wavelength ranges.

The microparticle measurement spectrometer 1 according to the second embodiment has the feature that when the light with which the amount of light per unit wavelength becomes the same is incident, the outputs of all channels of the photoelectric conversion array 12 and the output of the channel of the photoelectric conversion unit 13 (13a, 13b) are uniform.

In order for the outputs of all channels of the photoelectric conversion array 12 and the output of the channel of the photoelectric conversion unit 13 (13a, 13b) to be uniform when the light with which the amount of light per unit wavelength becomes the same is incident in the microparticle measurement spectrometer 1 according to the second embodiment, the method for calibrating the independent gain of each channel can use the first embodiment of the method for calibrating the microparticle measurement photoelectric conversion system according to the present technology described above.

Figure 6:
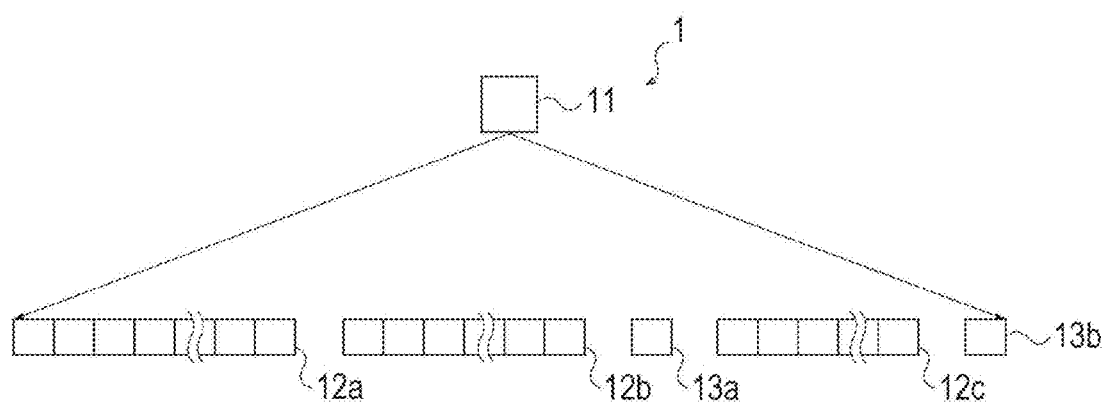
FIG. 6 is a conceptual diagram showing a third embodiment of a microparticle measurement spectrometer 1 according to the present technology.

FIG. 6 is a conceptual diagram showing the third embodiment of the microparticle measurement spectrometer 1 according to the present technology. The microparticle measurement spectrometer 1 according to the present technology may include a plurality of the photoelectric conversion arrays 12 (12a, 12b, 13c, and the like) where necessary. Furthermore, apart from the photoelectric conversion array 12, one or a plurality of photoelectric conversion units 13 (13a, 13b) may be provided.

The microparticle measurement spectrometer 1 according to the third embodiment has the feature that when the light with which the amount of light per unit wavelength becomes the same is incident, the outputs of all channels of the photoelectric conversion array 12 (12a, 12b, 12c) and the output of the channel of the photoelectric conversion unit 13 (13a, 13b) are uniform.

In order for the outputs of all channels of the photoelectric conversion array 12 (12a, 12b, 12c) and the output of the channel of the photoelectric conversion unit 13 (13a, 13b) to be uniform when the light with which the amount of light per unit wavelength becomes the same is incident in the microparticle measurement spectrometer 1 according to the third embodiment, the method for calibrating the independent gain of each channel can use the first embodiment of the method for calibrating the microparticle measurement photoelectric conversion system according to the present technology described above.

Furthermore, for the calibration of the independent gain of each channel of each photoelectric conversion array 12a, 12b, 12c, the method for calibrating the microparticle measurement photoelectric conversion system according to the second embodiment described later can also be used.

As described above, the above-mentioned microparticle measurement spectrometer 1 according to the present technology has the feature that the output of each channel is made uniform by the aforementioned calibration in a stage before the measurement of microparticles is performed practically. However, in reality, the characteristics of the microparticle measurement spectrometer 1 can be changed with time depending on the length of use time. Therefore, it is also possible to further improve the measurement accuracy by adjusting the independent gain and the output value of each channel during quality control (QC) or actual measurement performed before the actual measurement.

Specifically, for example, at the time of quality control (QC) performed before the actual measurement, fluorescent reference particles that emit fluorescence in a predetermined wavelength range width are caused to flow through the flow path P, and, on the basis of the optical information obtained from the fluorescent reference particles, the independent gain of each channel can be adjusted. In this way, when fluorescent beads with known characteristics are caused to flow before the actual measurement and the variation between the channels according to the total gain used and the amount of light of an excitation light source is compensated by the independent gain adjustment, the measurement accuracy can be further improved.

More specifically, the output value of each channel can be adjusted by the correction coefficient on the basis of the optical information from the fluorescent reference particles that emit fluorescence in a predetermined wavelength range width flowing through the flow path P (see, for example, Patent Document 1 and Patent Document 2). When the output value of each channel is adjusted only by the correction coefficient without using the independent gain, electrical noise can be emphasized and the SNR can deteriorate. However, with the microparticle measurement spectrometer 1 according to the present technology, because the independent gain of each channel is calibrated in advance, it can be expected that the deterioration of the SNR will be sufficiently small when the output value is finely adjusted by the correction coefficient immediately before the actual measurement.

As the fluorescent reference particles that can be used at this time, for example, align check beads, Ultra Rainbow fluorescent particles, and the like can be used. A condition that can be used as the fluorescent reference particle is that sufficient fluorescence intensity can be obtained in the wavelength range width of the PMT sensitivity to be corrected. Furthermore, for example, it is also possible to use particles such as beads labeled with a fluorescent dye. As the fluorescent dyes that can be used in the present technology, for example, one type or two or more types of Cascade Blue, Pacific Blue, Fluorescein isothiocyanate (FITC), Phycoerythrin (PE), Propidium iodide (PI), Texas red (TR), Peridinin chlorophyll protein (PerCP), Allophycocyanin (APC), 4',6-Diamidino-2-phenylindole (DAPI), Cy3, Cy5, Cy7, and the like can be freely combined and used.

Furthermore, at the time of actual measurement, it is also possible to adjust the independent gain of each channel on the basis of the optical information from the microparticles to be measured flowing through the flow path P. Specifically, for example, depending on the combination of microparticles to be measured, the independent gain is automatically adjusted and measured so that the gain is as large as possible within a non-saturating range, and the gain changed by the automatic adjustment is corrected so that the same reference spectrum can be used for analysis. In this way, the SNR can be maximized while effectively using the dynamic range to the maximum extent.

<3. Microparticle Measurement Device 2>

The microparticle measurement device 2 according to the present technology is characterized by including the above-mentioned microparticle measurement spectrometer 1 according to the present technology. Furthermore, the flow path P, a light irradiation unit 21, a light detection unit 22, a processing unit 23, a storage unit 24, a display unit 25, a sorting unit 26, and the like can be provided where necessary.

Figure 7:
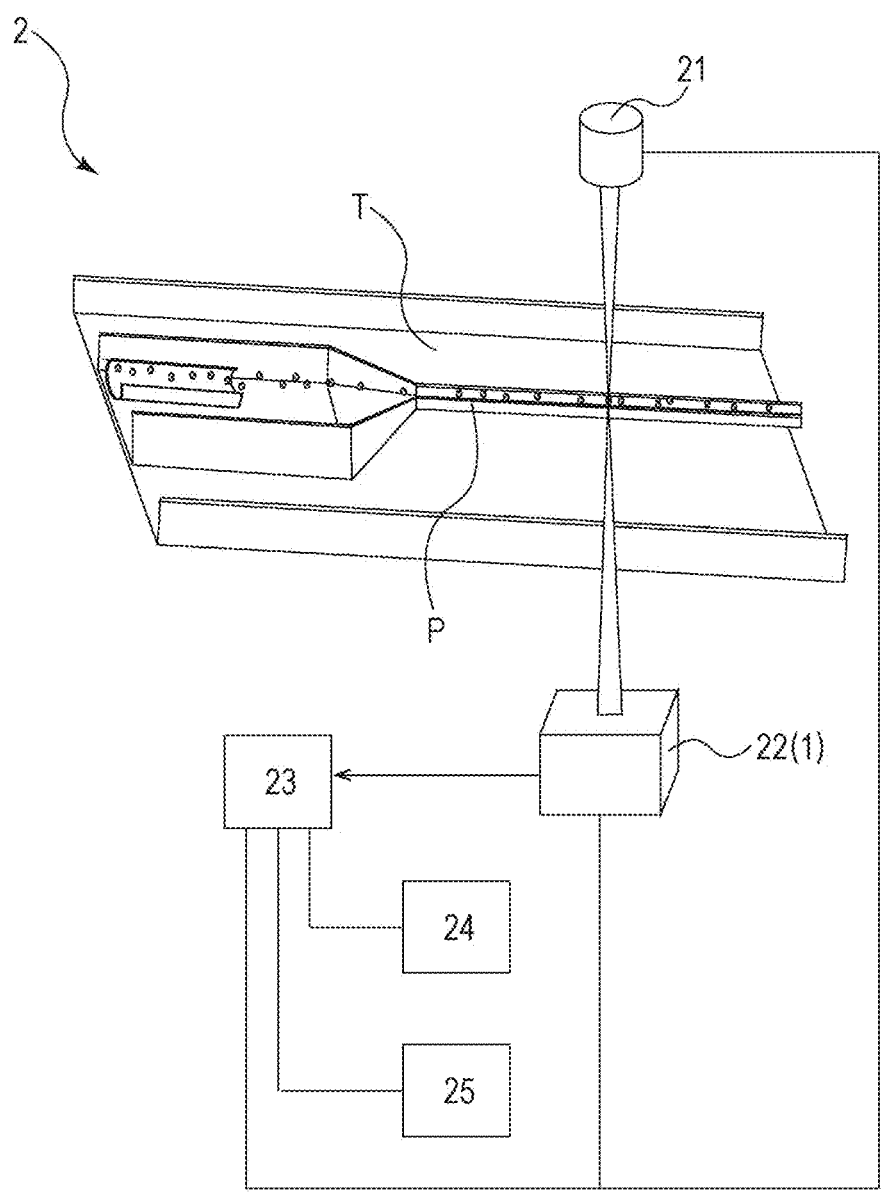
FIG. 7 is a schematic conceptual diagram schematically showing a first embodiment of a microparticle measurement device 1 according to the present technology.
Figure 8:
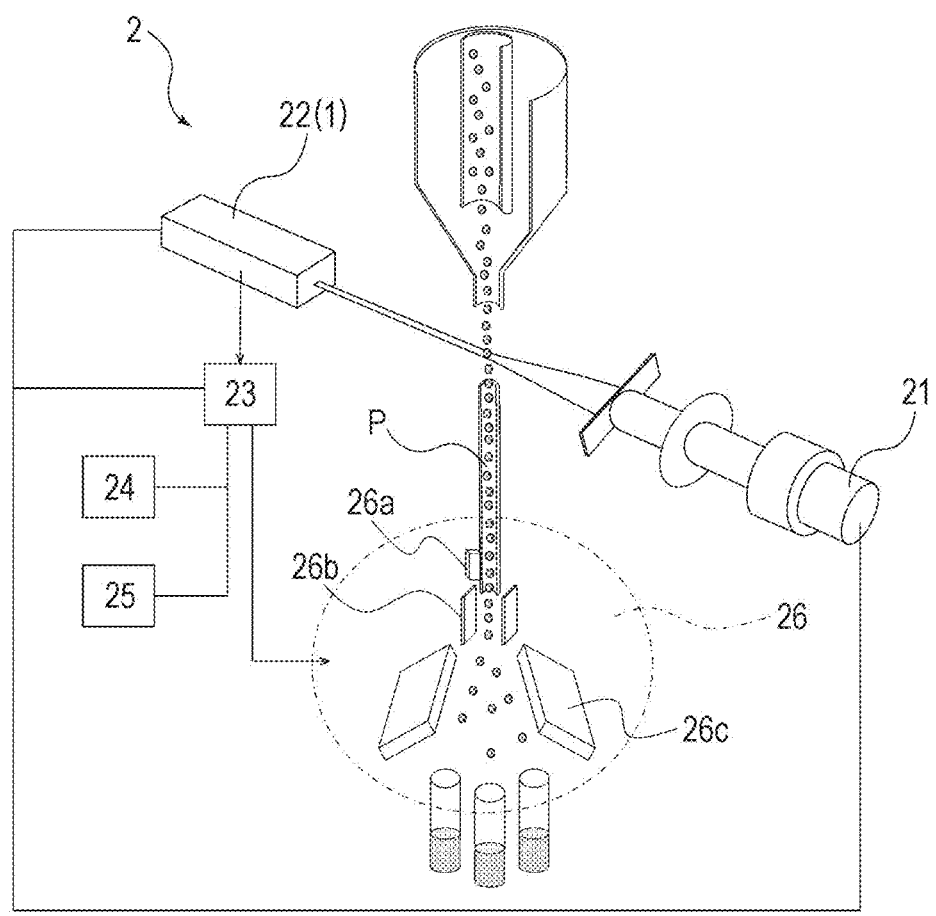
FIG. 8 is a schematic conceptual diagram schematically showing a second embodiment of a microparticle measurement device 1 according to the present technology.

FIG. 7 is a schematic conceptual diagram schematically showing the first embodiment of the microparticle measurement device 1 according to the present technology, and FIG. 8 is a schematic conceptual diagram schematically showing the second embodiment of the microparticle measurement device 1 according to the present technology. Hereinafter, the details of each unit will be described along with the time series of measurement.

(1) Flow Path P

In the flow cytometer that can use the microparticle measurement device 2 according to the present technology, the microparticles can be analyzed and sorted by detecting the optical information obtained from the microparticles arranged in a row in the flow cell (flow path P).

The flow path P may be provided in advance in the flow cytometer, but a commercially available flow path P or a disposable chip provided with the flow path P can be installed in the flow cytometer for analysis or sorting, for example.

The form of the flow path P is not particularly limited, and can be freely designed. For example, it is not limited to the flow path P formed in a substrate T such as two-dimensional or three-dimensional plastic or glass as shown in FIG. 7, but a flow path P used in a conventional flow cytometer as shown in FIG. 8 described later can also be used in the flow cytometer.

Furthermore, the flow path width, flow path depth, and flow path cross-sectional shape of the flow path P are not particularly limited as long as they are in the form that can form a laminar flow, and can be freely designed. For example, a micro flow path having a flow path width of 1 mm or less can also be used for the flow cytometer. In particular, a micro flow path having a flow path width of about 10 μm or more and 1 mm or less can be preferably used by a flow cytometer capable of using the microparticle measurement device 2 according to the present technology.

The microparticles that are caused to flow through the flow path P can be labeled with one type or two types or more dyes such as fluorescent dyes. In this case, examples of the fluorescent dyes that can be used in the present technology include Cascade Blue, Pacific Blue, Fluorescein isothiocyanate (FITC), Phycoerythrin (PE), Propidium iodide (PI), Texas red (TR), Peridinin chlorophyll protein (PerCP), Allophycocyanin (APC), 4',6-Diamidino-2-phenylindole (DAPI), Cy3, Cy5, Cy7, Brilliant Violet (BV421) and the like.

(2) Light Irradiation Unit 21

The microparticle measurement device 2 according to the present technology may include the light irradiation unit 21. The light irradiation unit 21 irradiates the microparticles flowing through the flow path P with light. In the microparticle measurement device 2 according to the present technology, the light irradiation unit 21 is not indispensable, and it is also possible to irradiate the microparticles flowing through the flow path P with light using an external light irradiation device or the like.

The type of light emitted from the light irradiation unit 21 is not particularly limited, but in order to reliably generate fluorescence or scattered light from the microparticles, light having a constant light direction, wavelength, and light intensity is desirable. As an example, a laser, an LED and the like can be mentioned. In a case where a laser is used, the type is not particularly limited, but one type or two or more types of an argon ion (Ar) laser, a helium-neon (He—Ne) laser, a dye laser, a krypton (Cr) laser, a semiconductor laser, a solid-state laser including a combination of the semiconductor laser and a wavelength conversion optical element, or the like can be freely used in combination.

(3) Light Detection Unit 22

The light detection unit 22 optically detects microparticles flowing through the flow path P. The microparticle measurement device 2 according to the present technology uses the microparticle measurement spectrometer 1 according to the present technology described above as the light detection unit 22. Note that since the details of the microparticle measurement spectrometer 1 according to the present technology are as described above, the description thereof is omitted here.

Furthermore, the microparticle measurement device 2 according to the present technology may include one or a plurality of light detection units 22 apart from the microparticle measurement spectrometer 1 according to the present technology. In a case where the light detection unit 22 is provided apart from the microparticle measurement spectrometer 1 according to the present technology, regarding the light detection unit 22 that can be used, the specific light detection method is not particularly limited as long as a light signal from the microparticles can be detected, and the light detection method used in a known light detector can be freely selected and adopted. For example, one type or two or more types of light detection methods used in fluorescence measuring instrument, scattered light measuring instrument, transmitted light measuring instrument, reflected light measuring instrument, diffracted light measuring instrument, ultraviolet spectroscopic measuring instrument, infrared spectroscopic measuring instrument, Raman spectroscopic measuring instrument, FRET measuring instrument, FISH measuring instrument, and others various spectrum measuring instruments, PMT arrays or photodiode arrays in which light receiving elements such as PMTs and photodiodes are one-dimensionally arranged, those in which multiple independent detection channels such as two-dimensional light receiving elements such as CCDs or CMOSs are arranged, or the like can be adopted in combination.

Furthermore, the installation location of the light detection unit 22 (microparticle measurement spectrometer 1) in the microparticle measurement device 2 according to the present technology is not particularly limited as long as the optical signal from the microparticles can be detected, and can be freely designed. For example, as shown in FIGS. 7 and 8, it is preferable to arrange it on the side opposite the light irradiation unit 21 across the flow path P. By arranging the light detection unit 22 (microparticle measurement spectrometer 1) on the side opposite the light irradiation unit 21 across the flow path P, the light irradiation unit 21 and the light detection unit 22 can be arranged in a freer configuration. Furthermore, for example, since fluorescence is radiated in a direction different from the incident direction of the irradiation light, the light detection unit 22 (microparticle measurement spectrometer 1) may be arranged on the same side as the light irradiation unit 21 or on the side 90 degrees to the side with reference to the flow path P.

(4) Processing Unit 23

The processing unit 12 performs information processing of optical information from the microparticles detected by the light detection unit 22, and controls the light irradiation unit 21, the storage unit 24, the display unit 25, the sorting unit 26, and the like, which will be described later.

As the information processing performed by the processing unit 23, spectrum data is generated from the optical information detected by the light detection unit 22. Furthermore, in the processing unit 23, as described above, it is also possible to adjust the independent gain and the output value of each channel during quality control (QC) or actual measurement performed before the actual measurement.

(5) Storage Unit 24

The microparticle measurement device 2 according to the present technology can include the storage unit 24 that stores various information. The storage unit 24 can store all kinds of matters related to measurement such as values detected by the light detection unit 22 (microparticle measurement spectrometer 1), spectrum data generated by the processing unit 23, a total gain, an independent gain of each channel, and the like.

In the microparticle measurement device 1 according to the present technology, the storage unit 24 is not indispensable, and an external storage device may be connected. As the storage unit 24, for example, a hard disk or the like can be used.

(6) Display Unit 25

The microparticle measurement device 2 according to the present technology can include the display unit 25 that displays various information. The display unit 25 can display all kinds of matters related to measurement such as values detected by the light detection unit 22 (microparticle measurement spectrometer 1), spectrum data generated by the processing unit 23, a calculated correction coefficient, a total gain, an independent gain of each channel, and the like.

In the microparticle measurement device 1 according to the present technology, the display unit 25 is not indispensable, and an external display device may be connected. As the display unit 25, for example, a display or a printer can be used.

(7) Sorting Unit 26

The microparticle measurement device 2 according to the present technology can include the sorting unit 26 that sorts the microparticles as in the second embodiment shown in FIG. 8. In the sorting unit 26, the microparticles are sorted on the basis of the spectrum data generated by the processing unit 23 from the values detected by the light detection unit 22 (microparticle measurement spectrometer 1). For example, the sorting unit 26 can sort the microparticles downstream of the flow path P on the basis of analysis results of the size, form, internal structure, and the like of the microparticles analyzed from the spectrum data.

More specifically, as shown in FIG. 8, for example, by using a vibrating element 26a or the like that vibrates at a predetermined frequency, vibration is applied to the whole or a part of the flow path P to generate droplets from an outlet of the flow path P. Note that, in this case, the vibrating element 26a to be used is not particularly limited, and a known one can be freely selected and used. As an example, a piezo vibrating element or the like can be mentioned. Furthermore, the size of the droplets is adjusted by adjusting the amount of liquid sent to the flow path P, the diameter of the outlet, the frequency of the vibrating element, and the like, so that the droplets containing a certain amount of microparticles can be generated.

Next, positive or negative charges are charged on the basis of the analysis results of the size, form, internal structure, and the like of the microparticles analyzed on the basis of the spectrum data generated by the processing unit 23 (see reference numeral 26b in FIG. 8). Then, the path of the charged droplets is changed in a desired direction by a counter electrode 26c to which the voltage has been applied, and the charged droplets are sorted.

Figure 9:
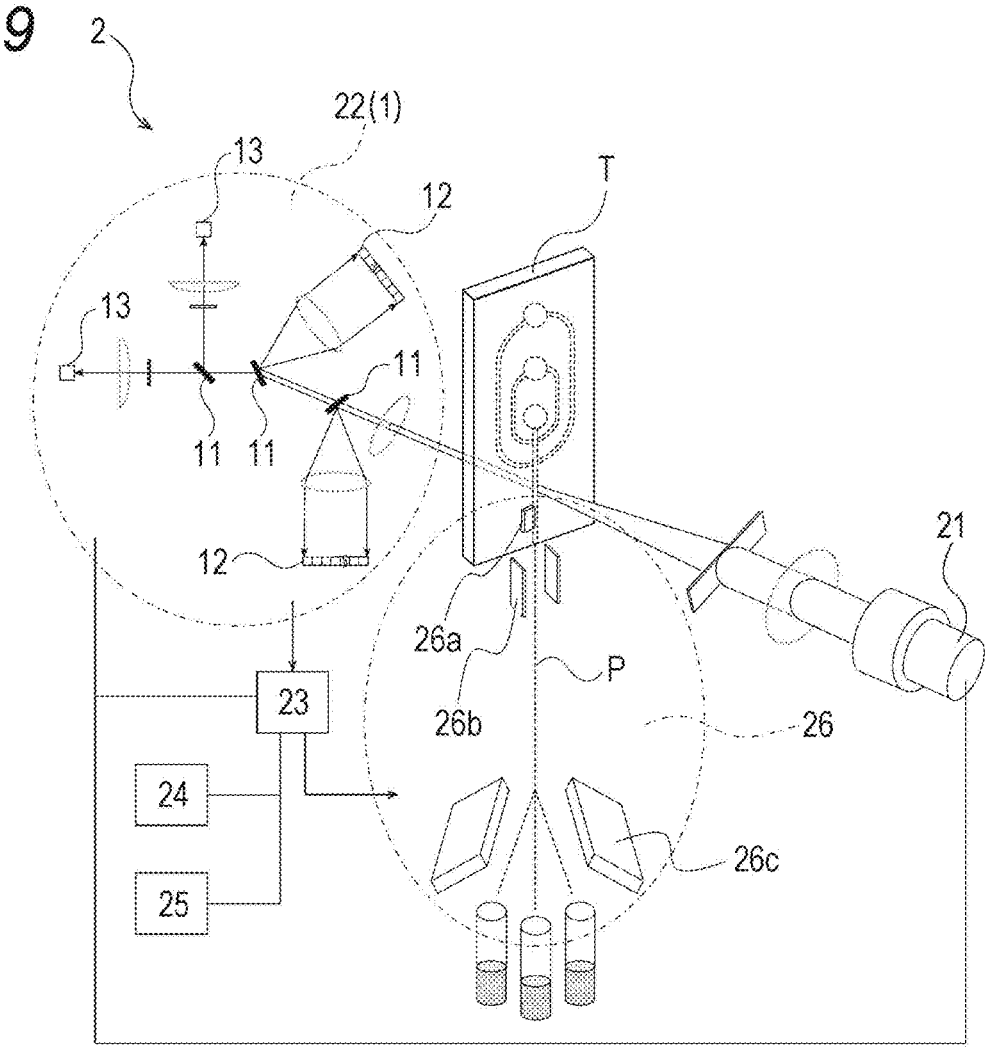
FIG. 9 is a schematic conceptual diagram schematically showing a third embodiment of a microparticle measurement device 1 according to the present technology.

In the microparticle measurement device 2 described above, in recent years, there has been a demand for a high-performance measuring device capable of simultaneously handling microparticles dyed with as many types of phosphors as possible and performing multicolor separation. Therefore, the microparticle measurement device 2 according to the present invention can be configured as a multi-deck microparticle measurement device 2 as described in the third embodiment shown in FIG. 9 equipped with several types of excitation light sources and including a plurality of the photoelectric conversion arrays 12 and a plurality of the photoelectric conversion units 13.

<4. Method for Calibrating the Microparticle Measurement Photoelectric Conversion System (Second to Fourth Embodiments)>

(1) Calibration Method According to the Second Embodiment

The calibration method according to the second embodiment is a calibration method that can be used for the calibration of the microparticle measurement photoelectric conversion system including a plurality of photoelectric conversion arrays 12 like the microparticle measurement spectrometer 1 according to the third embodiment described above (see FIG. 6). Specifically, it is a method for calibrating the total gain of the microparticle measurement photoelectric conversion system and the independent gain of each channel so that the same measurement result as the microparticle measurement photoelectric conversion reference array, which is a reference, can be obtained.

As described above, for the calibration of the microparticle measurement spectrometer 1 according to the third embodiment, calibration can be performed by the calibration method according to the first embodiment, but because the microparticle measurement spectrometer 1 according to the third embodiment includes a plurality of the photoelectric conversion arrays 12 (12*a*, 12*b*, 12*c*), the number of channels becomes enormous. Therefore, it is possible to simplify the calibration such that after defining the microparticle measurement photoelectric conversion reference array, which is a reference, the total gain of another photoelectric conversion array and the independent gain of each channel are calibrated so that the same measurement result as the microparticle measurement photoelectric conversion reference array can be obtained.

More specifically, for the microparticle measurement photoelectric conversion reference array, after performing a reference array calibration process of calibrating the independent gain of each channel so that the outputs of all channels become uniform when light with which the amount of light per unit wavelength becomes the same is incident, an independent gain setting process of setting the independent gain of each channel of a microparticle measurement photoelectric conversion array to be calibrated according to the independent gain of each channel after calibration of the microparticle measurement photoelectric conversion reference array is performed.

At this time, as the microparticle measurement photoelectric conversion reference array, it is preferable to select an array having the minimum variation in characteristics between channels among all microparticle measurement photoelectric conversion arrays.

(2) Calibration Method According to the Third Embodiment

The calibration method according to the third embodiment is a method of further performing, with respect to the microparticle measurement photoelectric conversion system, which has been subjected to the calibration using the calibration method according to the second embodiment, an adjustment process in which fluorescent reference particles that emits fluorescence in a predetermined wavelength range width are caused to flow through the flow path P at the time of quality control (QC) performed before the actual measurement and on the basis of the optical information obtained from the fluorescent reference particles, the output value is adjusted by a correction coefficient.

Since the calibration method according to the second embodiment simplifies the calibration of arrays other than the microparticle measurement photoelectric conversion reference array, the outputs of all channels of the microparticle measurement photoelectric conversion system are not exactly the same. Therefore, fluorescent beads with known characteristics are caused to flow before the actual measurement and the variation between the channels according to the total gain used and the amount of light of an excitation light source is compensated by the independent gain adjustment to improve the measurement accuracy.

(3) Calibration Method According to the Fourth Embodiment

The calibration method according to the fourth embodiment is a method for calibrating the total gain of the microparticle measurement photoelectric conversion system and the independent gain of each channel so that, for example, in a case where a plurality of microparticle measurement devices such as mass production devices is produced, a microparticle measurement reference device, which is a reference, is defined and the same measurement result as the microparticle measurement reference device is obtained.

Note that since the specific calibration method can be performed by a method similar to the calibration method according to the second embodiment, the description thereof is omitted here.

Furthermore, in a case where the calibration of the microparticle measurement device other than the microparticle measurement reference device, which is a reference, is simplified, like the calibration method according to the third embodiment, it is also possible to further perform an adjustment process in which fluorescent reference particles that emits fluorescence in a predetermined wavelength range width are caused to flow through the flow path P at the time of quality control (QC) performed before the actual measurement and on the basis of the optical information obtained from the fluorescent reference particles, the output value is adjusted by a correction coefficient.

EXAMPLE

Hereinafter, the present technology will be described in more detail on the basis of an example. Note that an example described below indicates an example of representative examples of the present technology, and it does not make the scope of the present technology to be understood narrowly.

In order to confirm the effectiveness of the present invention, the independent gain of the PMT array of the multi-deck flow cytometer corresponding to six types of excitation light was calibrated.

Figure 10:
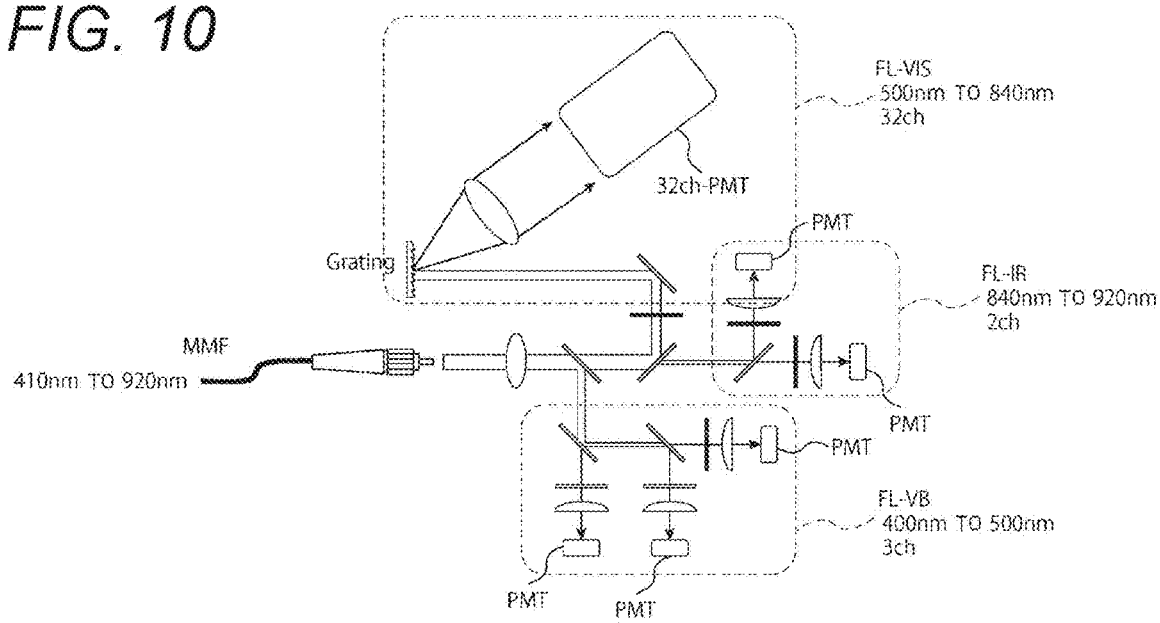
FIG. 10 is a schematic conceptual diagram showing a deck layout of a multi-deck flow cytometer used in an example.
Figure 11:
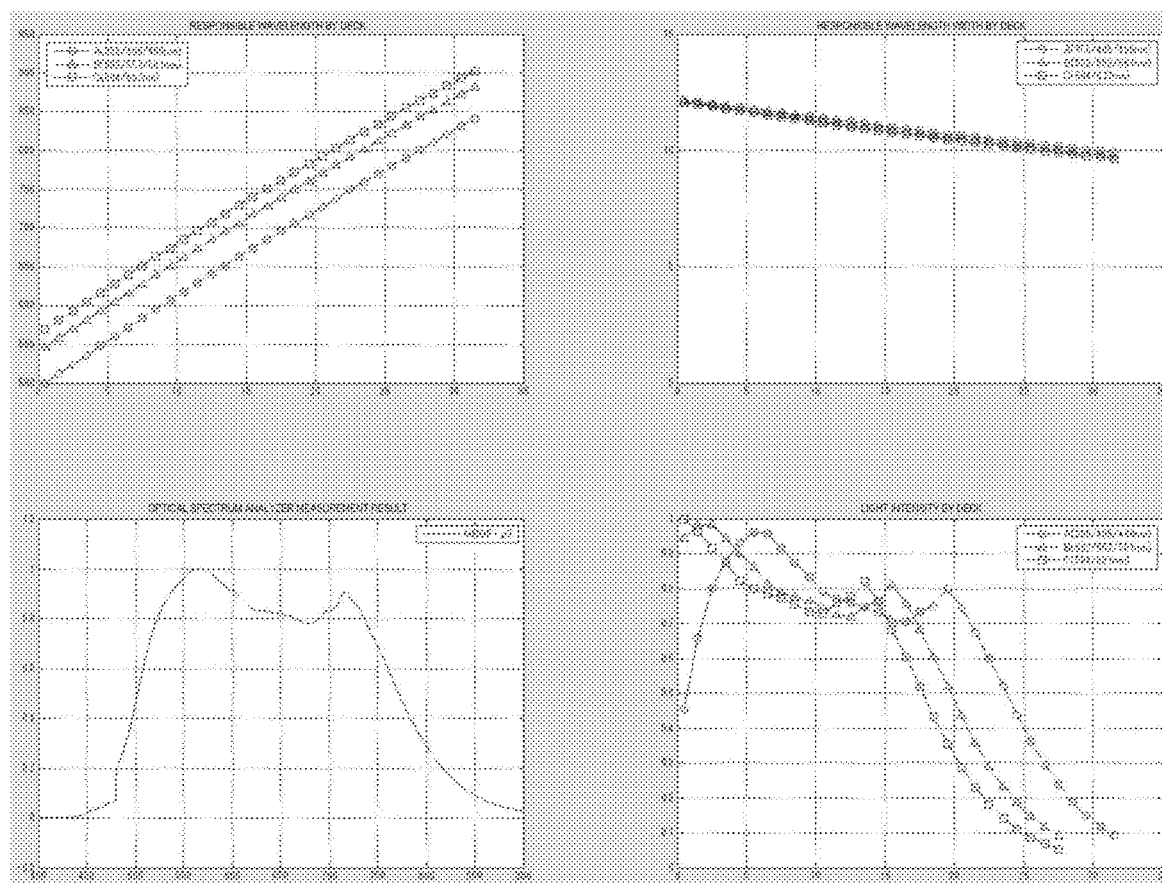
FIG. 11 is an explanatory diagram showing wavelength allocation of each deck of the multi-deck flow cytometer used in the example.

FIG. 10 is a schematic conceptual diagram showing a deck layout of a multi-deck flow cytometer used in the present example, and FIG. 11 is an explanatory diagram showing wavelength allocation of each deck. The multi-deck flow cytometer used in the present example includes six decks mounted, and the wavelengths of the excitation light sources are 355 nm, 405 nm, 488 nm, 5xx nm (one of 532 nm, 552 nm, 561 nm), 594 nm, and 637 nm, respectively. Within fluorescence (FL) signals, ultraviolet light (UV) 360 to 400 nm of the 355 nm deck is preliminarily separated and incident on a single PMT for two channels (not shown). As shown in FIG. 10, the other fluorescence signals are incident on an optical fiber that enables passing of 410 to 920 nm, and blue light (VB) of 410 to 500 nm is incident on a single PMT for three channels, infrared light (IR) of 840 to 920 nm is incident on a single PMT for two CHs, and the remaining 500 to 840 nm is dispersed by a grating filter and then incident on the PMT array. FIG. 11 shows the wavelength allocation for each of the six decks, but the number and type of single PMTs used for each deck are different, and the responsible wavelengths of each channel of the PMT array are also different.

Figure 12:
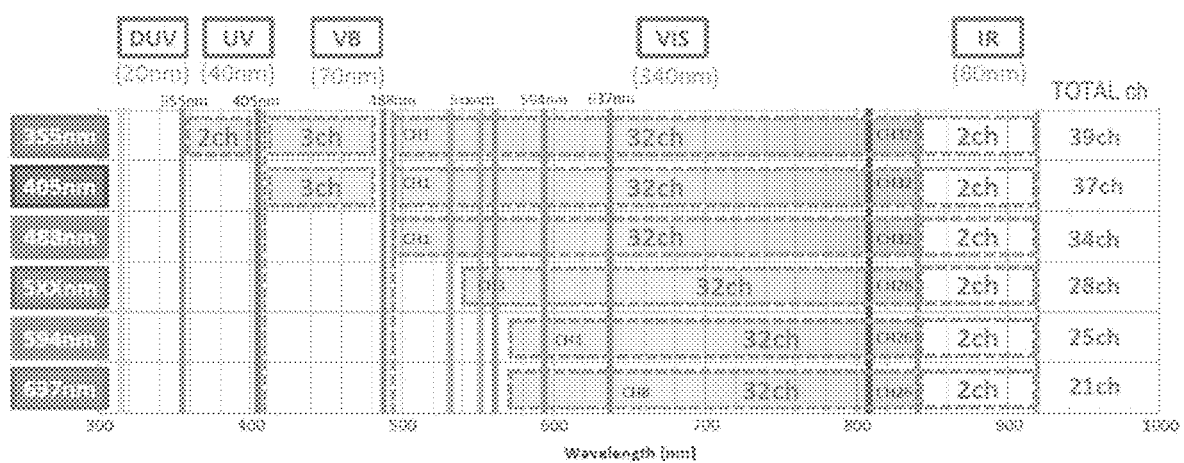
FIG. 12 in which an upper part is a drawing-substitute graph showing a relationship between an LED light source and channels of each deck used in the present example, and a lower part is a drawing-substitute graph showing a relationship between the amount of light of an LED light source and CH used for calibration.
Figure 13:
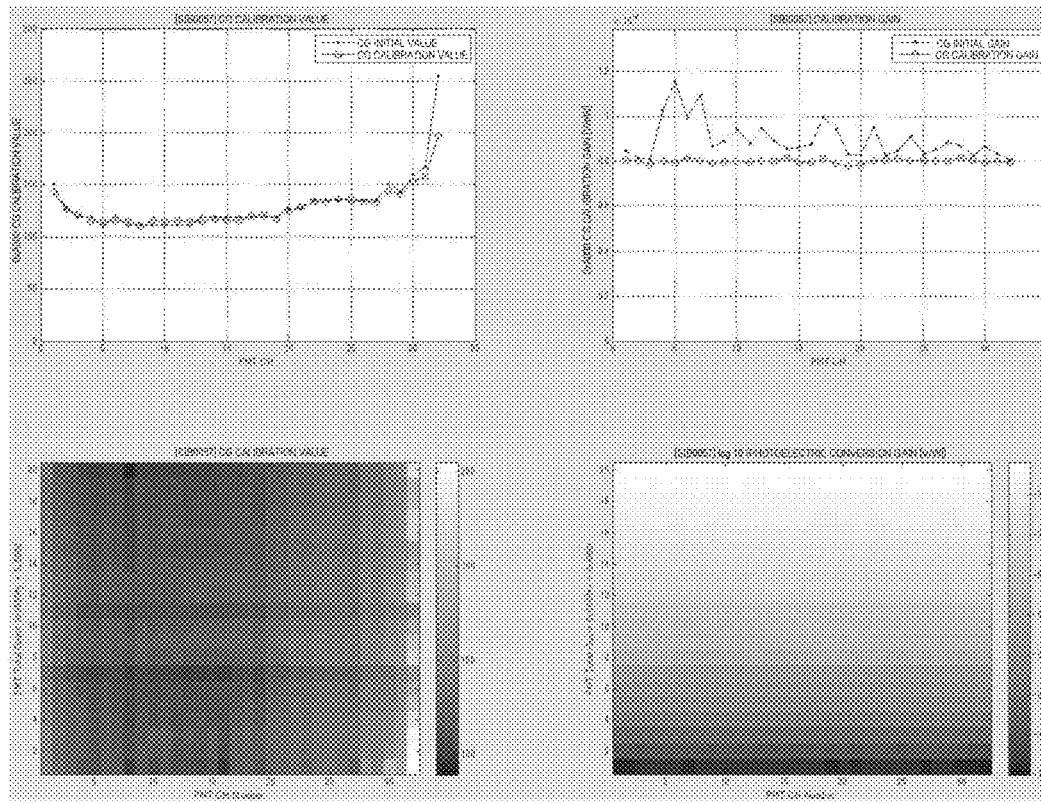
FIG. 13 is a drawing-substitute graph showing results of calibrating an independent gain of an excitation deck A at 355 nm used in the example.
Figure 14:
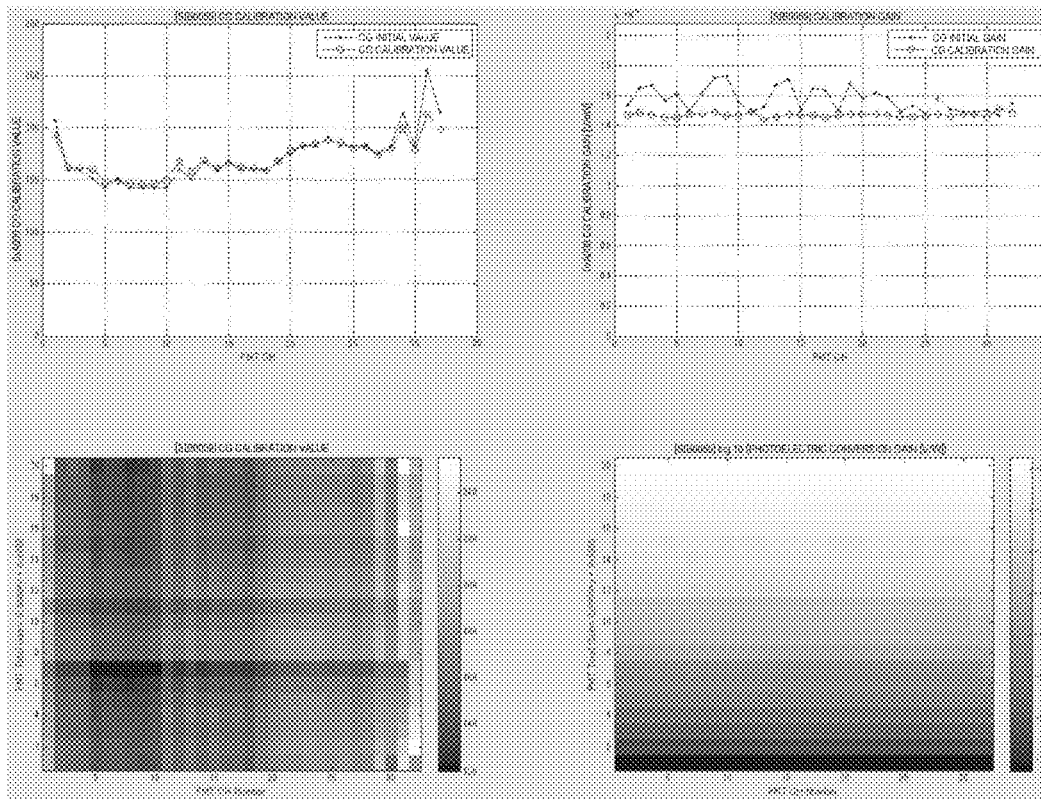
FIG. 14 is a drawing-substitute graph showing results of calibrating an independent gain of a deck A excited at 405 nm used in the example.
Figure 15:
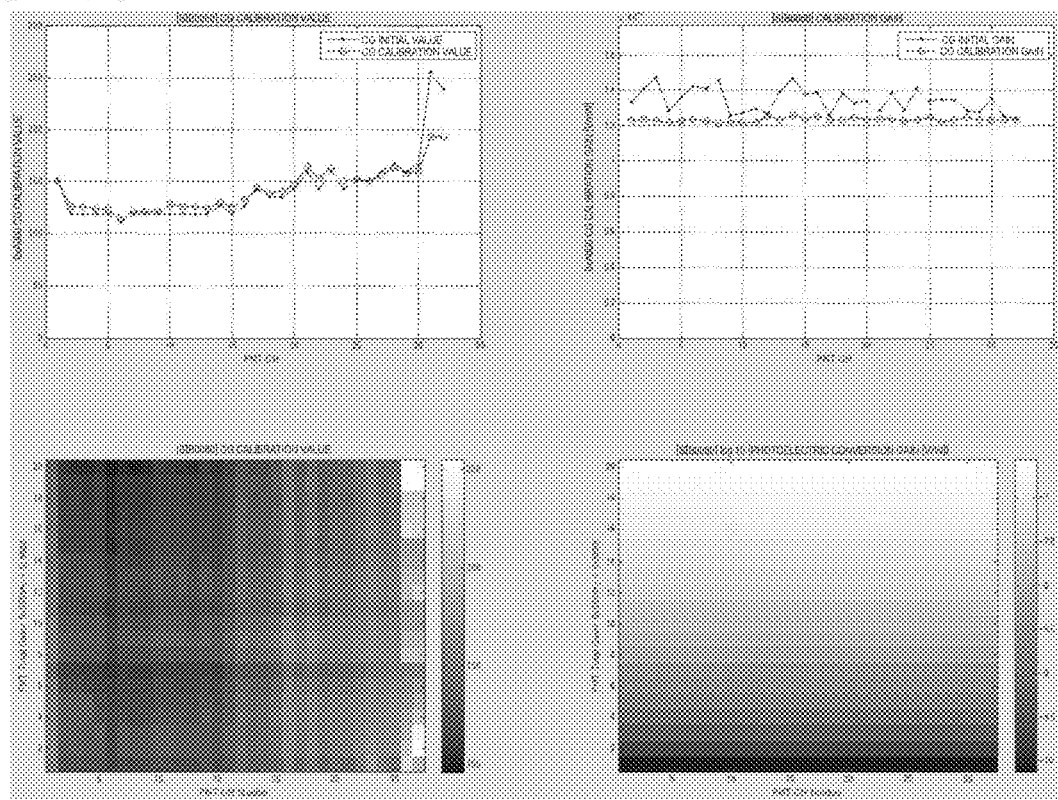
FIG. 15 is a drawing-substitute graph showing results of calibrating the independent gain of the deck A excited at 488 nm used in the example.
Figure 16:
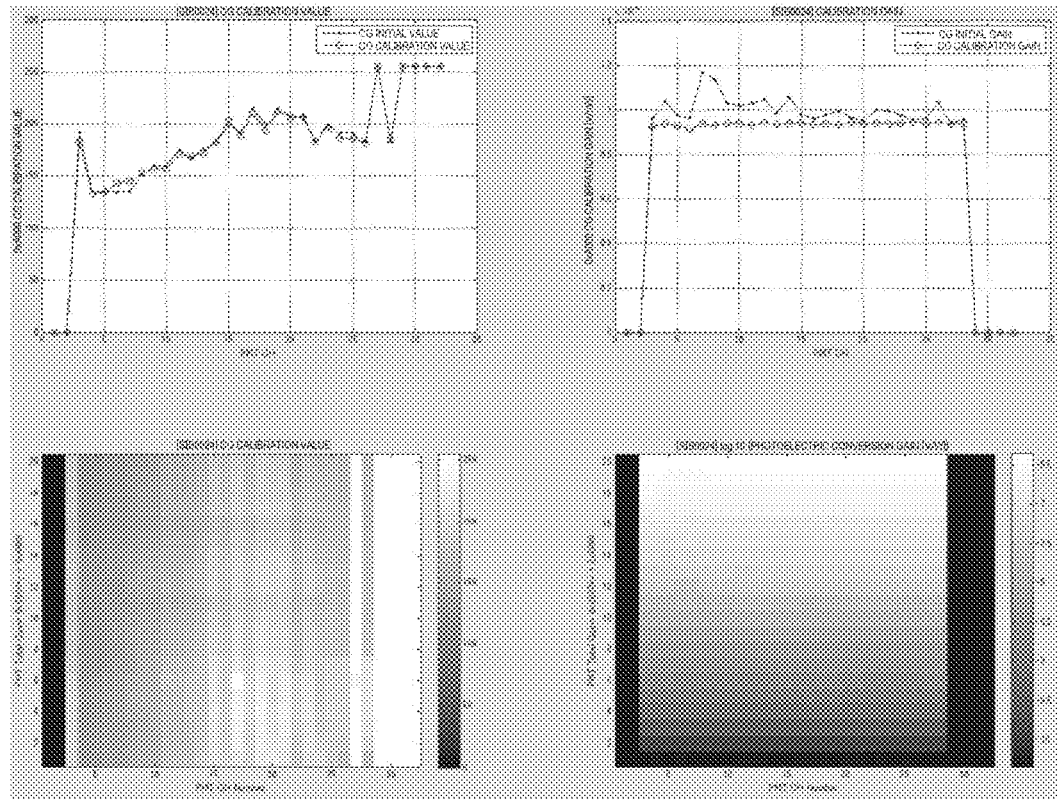
FIG. 16 is a drawing-substitute graph showing results of calibrating an independent gain of a deck B excited at 5xx nm used in the example.
Figure 17:
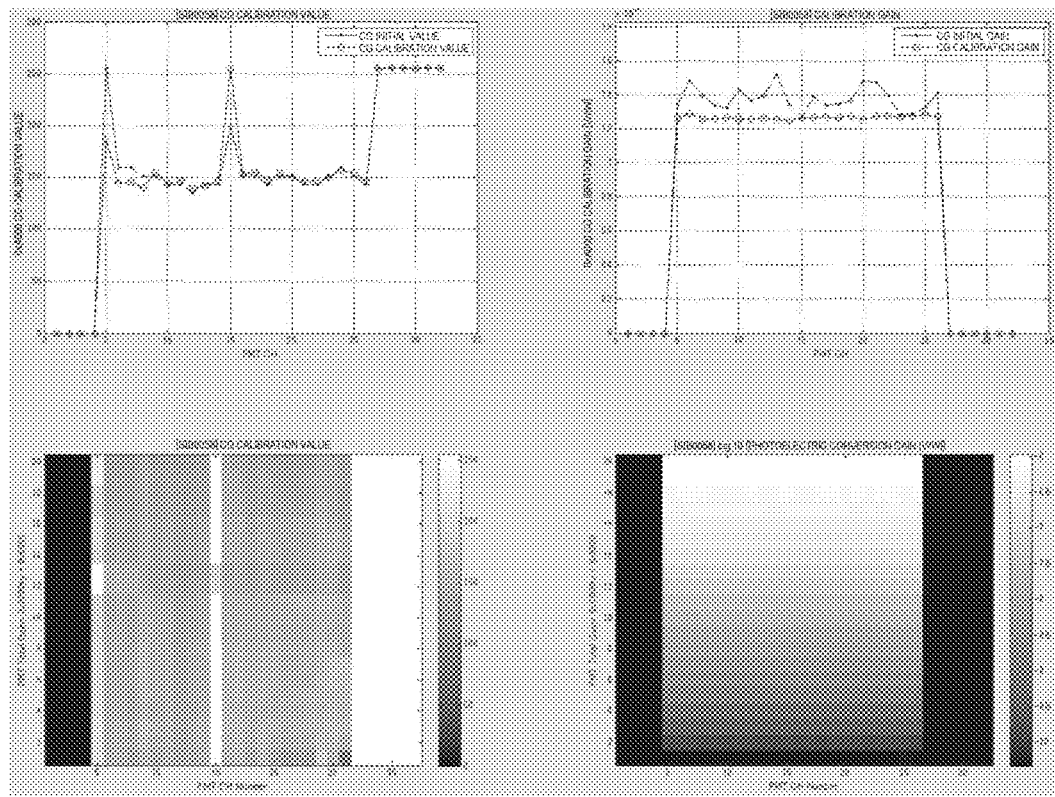
FIG. 17 is a drawing-substitute graph showing results of calibrating an independent gain of a deck C excited at 594 nm used in the example.
Figure 18:
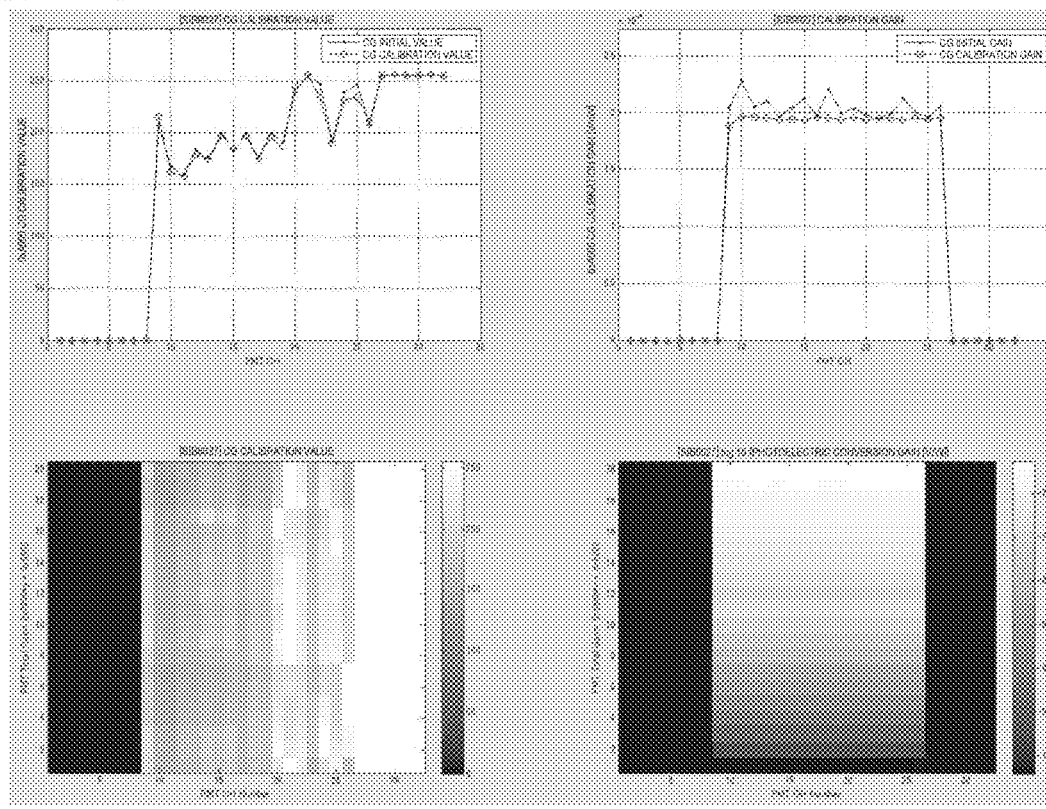
FIG. 18 is a drawing-substitute graph showing results of calibrating the independent gain of the deck C excited at 637 nm used in the example.

The upper part of FIG. 12 shows the relationship between LED light sources and channels of decks (hereinafter referred to as "CH") used in the present example. The angle of a diffraction grating is adjusted such that a deck A equipped with excitation light sources of 355 nm, 405 nm, and 488 nm is responsible from 500 to 840 nm, a deck B equipped with a light source of any of 532 nm, 552 nm, and 561 nm is responsible from 550 to 870 nm, and a deck C equipped with excitation light sources of 594 nm and 637 nm is responsible for a wavelength band of 570 to 900 nm.

The lower part of FIG. 12 shows the relationship between the amount of light of the LED light sources and the CHs used for calibration. As shown in FIG. 5, the quantum efficiency of the PMT array used this time is very small at or above 850 nm, and therefore CHs with wavelengths longer than this were not subjected to the calibration. Furthermore, since fluorescence with a shorter wavelength than the excitation light source is not emitted, CHs with a shorter wavelength than the excitation light source were not subjected to the calibration either. The CHs subjected to the calibration are shown in Table 1 below.

TABLE 1

| DECK | NUMBER | CALIBRATION TARGET CH | REFERENCE CH | BB LED | NB LED |
|---|---|---|---|---|---|
| A (355 nm/405 nm/488 nm) | 3 | CH1 TO 32 | 32 | CH1 TO 32 | NONE |
| B (532 nm/552 nm/561 nm) | 1 | CH3 TO 28 | 28 | CH3 TO 28 | CH29 TO 32 |
| C (594 nm) | 1 | CH4 TO 26 | 26 | CH3 TO 28 | CH29 TO 32 |
| C (637 nm) | 1 | CH8 TO 26 | 26 | CH3 TO 28 | CH29 TO 32 |

The results of the calibration of the independent gains of the six decks are shown in FIGS. 13 to 18. In the upper part of each drawing, the calibration value of the independent gain (channel gain (hereinafter referred to as "CG")) when a control voltage (Vctl) is 3 V as the total gain (TG) and the photoelectric conversion gain after the calibration (OEG(i) =V(i)/RCP(i)) are shown. In the flowchart of FIG. 2, a CG initial value is a CG value closest to the minimum photoelectric conversion gain (OEG(ch_min)) with ΔCG=8, and the gain at this time is a CG initial gain. Then, with ΔCG=1, a CG value closest to the minimum photoelectric conversion gain (OEG(ch_min)) was obtained as a CG calibration value, and the gain at this time is a CG calibration gain.

The lower part of each drawing is the CG calibration value and the CG calibration gain when the control voltage (Vctl) is set to Vctl=1.5 to 4.5 [V] as the total gain (TG). From these results, it was found that the independent gain can be calibrated so that the outputs of all channels are the same using the calibration method according to the present technology. On the other hand, the CG calibration value is slightly different for each total gain, and using an independent gain adjusted with one total gain may not result in strict calibration. Therefore, it is considered that the measurement accuracy can be further improved by adjusting the independent gain or the output value of each channel at the time of quality control (QC) performed before actual measurement or at the time of actual measurement.

Figure 19:
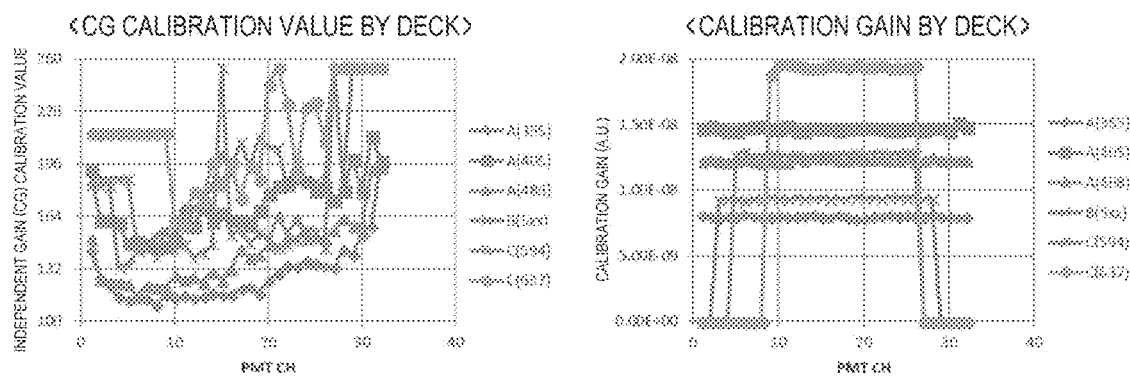
FIG. 19 is a drawing-substitute graph collectively showing results of calibrating independent gains of six decks used in the example.

FIG. 19 is a summary of the calibration results of the six decks. From the drawing on the left, it can be seen that the CH that has the minimum gain differs depending on the individual PMT array, and the variation between the CHs is also different. For example, in a case where the total gain of another photoelectric conversion array and the independent gain of each channel are calibrated so that the same measurement result as the microparticle measurement photoelectric conversion reference array can be obtained as in the calibration method according to the second embodiment, it is desirable to use data of the deck A excited at 355 nm or the deck A excited at 488 nm where the variation between the channels is small.

From the drawing on the right, it can be seen that in a case where the control voltage (Vctl) is the same as the total gain (TG), the gain after the calibration differs greatly for each PMT array.

Note that the present technology may also be configured as below.

(1)

A microparticle measurement spectrometer including:
a spectroscopic element that disperses light emitted from microparticles flowing through a flow path; and
a photoelectric conversion array that has a plurality of light receiving elements having different detection wavelength ranges and converts optical information obtained by the light receiving elements into electrical information, in which
the photoelectric conversion array has a uniform output of all channels when light with which the amount of light per unit wavelength becomes same is incident.

(2)

The microparticle measurement spectrometer according to (1), in which
the photoelectric conversion array has an independent gain of each channel calibrated so that a photoelectric conversion gain of a channel by which a photoelectric conversion gain becomes minimum is equivalent to a photoelectric conversion gain of another channel among all channels when an independent gain is set to the same value in a state where a total gain is set to an arbitrary value.

(3)

The microparticle measurement spectrometer according to (2), in which
the photoelectric conversion array has the independent gain of each channel calibrated with respect to each setting value of the total gain.

(4)

The microparticle measurement spectrometer according to any of (1) to (3), in which
the photoelectric conversion array has the independent gain of each channel adjusted on the basis of optical information from fluorescent reference particles emitting fluorescence of a predetermined wavelength range width flowing through a flow path.

(5)

The microparticle measurement spectrometer according to any of (1) to (4), in which
the photoelectric conversion array has an output value of each channel adjusted by a correction coefficient on the basis of optical information from fluorescent reference particles emitting fluorescence of a predetermined wavelength range width flowing through a flow path.

(6)

The microparticle measurement spectrometer according to any of (1) to (5), in which the photoelectric conversion array has an independent gain of each channel adjusted on the basis of optical information from microparticles to be measured flowing through a flow path.

(7)

The microparticle measurement spectrometer according to any of (1) to (6), further including, apart from the photoelectric conversion array: a photoelectric conversion unit that includes a light receiving element and converts optical information obtained by the light receiving element to electrical information, in which outputs of all channels of the photoelectric conversion array and an output of a channel of the photoelectric conversion unit are uniform when light with which the amount of light per unit wavelength becomes the same is incident.

(8)

The microparticle measurement spectrometer according to (7), further including: a plurality of the photoelectric conversion units.

(9)

The microparticle measurement spectrometer according to any of (1) to (8), further including: a plurality of the photoelectric conversion arrays, in which outputs of all channels of all the photoelectric conversion arrays are uniform when the light with which the amount of light per unit wavelength becomes the same is incident.

(10)

A microparticle measurement device including:
a microparticle measurement spectrometer including:
a spectroscopic element that disperses light emitted from microparticles flowing through a flow path, and
a photoelectric conversion array that has a plurality of light receiving elements having different detection wavelength ranges and converts optical information obtained by the light receiving elements into electrical information, in which
the photoelectric conversion array has a uniform output of all channels when light with which the amount of light per unit wavelength becomes the same is incident.

(11)

A method for calibrating a microparticle measurement photoelectric conversion system, the method including:
receiving light emitted from microparticles flowing through a flow path with a plurality of light receiving elements having different detection wavelength ranges; and
converting optical information obtained by the light receiving elements into electrical information, in which outputs of all channels are uniform when light with which the amount of light per unit wavelength becomes the same is incident.

(12)

The method for calibrating a microparticle measurement photoelectric conversion system according to (11), the method performing:
a minimum channel determination process of searching for a channel by which a photoelectric conversion gain becomes minimum; and
an independent gain adjustment process of adjusting an independent gain of each channel so that a photoelectric conversion gain of all channels becomes equivalent to a photoelectric conversion gain of a minimum channel, in which the outputs of all the channels are uniform when the light with which the amount of light per unit wavelength becomes the same is incident.

(13)

The method for calibrating a microparticle measurement photoelectric conversion system according to (11) or (12), in which a total gain of the microparticle measurement photoelectric conversion system and an independent gain of each channel are calibrated to obtain the same measurement result as a microparticle measurement reference device, which is a reference.

(14)

The method for calibrating a microparticle measurement photoelectric conversion system according to any of (11) to (13), the method for calibrating a microparticle measurement photoelectric conversion system having two or more microparticle measurement photoelectric conversion reference arrays, in which a total gain of the microparticle measurement photoelectric conversion array and an independent gain of each channel are calibrated to obtain the same measurement result as a microparticle measurement photoelectric conversion reference array, which is a reference.

(15)

The method for calibrating a microparticle measurement photoelectric conversion system according to (14), in which the microparticle measurement photoelectric conversion reference array includes a microparticle measurement photoelectric conversion array with a minimum variation in characteristics between channels among all microparticle measurement photoelectric conversion arrays.

(16)

The method for calibrating a microparticle measurement photoelectric conversion system according to (15), the method performing:
a reference array calibration process of calibrating an independent gain of each channel so that outputs of all channels are uniform when the light with which the amount of light per unit wavelength becomes the same is incident regarding the microparticle measurement photoelectric conversion reference array; and
an independent gain setting process of setting an independent gain of each channel of a microparticle measurement photoelectric conversion array to be calibrated according to an independent gain of each channel after calibration of the microparticle measurement photoelectric conversion reference array.

(17)

The method for calibrating a microparticle measurement photoelectric conversion system according to (16), further performing:
an adjustment process of adjusting an output value of each channel using a correction coefficient on the basis of optical information from fluorescent reference particles emitting fluorescence of a predetermined wavelength range width flowing through a flow path.

REFERENCE SIGNS LIST

1 Microparticle measurement spectrometer
11 Spectroscopic element
12 Photoelectric conversion array
13 Photoelectric conversion unit
2 Microparticle measurement device
P Flow path
21 Light irradiation unit
22 Light detection unit 23 Processing unit
24 Storage unit
25 Display unit
36 Sorting unit

The invention claimed is:

1. A microparticle measurement spectrometer, comprising:
a spectroscopic element configured to disperse that light emitted from microparticles flowing through a flow path; and
a photoelectric conversion array that has a plurality of light receiving elements having different detection wavelength ranges, wherein
the photoelectric conversion array is configured to convert optical information obtained by the light receiving elements into electrical information, and
outputs of all channels of the photoelectric conversion array are uniform when light, with which an amount of light per unit wavelength becomes same, is incident on the photoelectric conversion array.

2. The microparticle measurement spectrometer according to claim 1, wherein
the photoelectric conversion array has an independent gain of each channel calibrated so that a photoelectric conversion gain of a channel by which a photoelectric conversion gain becomes minimum is equivalent to a photoelectric conversion gain of another channel among all channels when an independent gain is set to a same value in a state where a total gain of the photoelectric conversion array is set to an arbitrary value.

3. The microparticle measurement spectrometer according to claim 2, wherein
the photoelectric conversion array has the independent gain of each channel calibrated with respect to each value set for the total gain.

4. The microparticle measurement spectrometer according to claim 1, wherein
the photoelectric conversion array has the independent gain of each channel adjusted on a basis of optical information from fluorescent reference particles emitting fluorescence of a predetermined wavelength range width flowing through the flow path.

5. The microparticle measurement spectrometer according to claim 1, wherein
the photoelectric conversion array has an output value of each channel adjusted by a correction coefficient on a basis of optical information from fluorescent reference particles emitting fluorescence of a predetermined wavelength range width flowing through the flow path.

6. The microparticle measurement spectrometer according to claim 1, wherein
the photoelectric conversion array has an independent gain of each channel adjusted on a basis of optical information from microparticles to be measured flowing through the flow path.

7. The microparticle measurement spectrometer according to claim 1, further comprising, apart from the photoelectric conversion array:
a photoelectric conversion unit that includes a light receiving element, wherein
the photoelectric conversion unit is configured to convert optical information obtained by the light receiving element to electrical information, and
outputs of all channels of the photoelectric conversion array and an output of a channel of the photoelectric conversion unit are uniform when the light, with which an amount of light per unit wavelength becomes same, is incident on the photoelectric conversion array and the photoelectric conversion unit.

8. The microparticle measurement spectrometer according to claim 7, further comprising:
a plurality of the photoelectric conversion units.

9. The microparticle measurement spectrometer according to claim 1, further comprising:
a plurality of the photoelectric conversion arrays, wherein
outputs of all channels of all the plurality of photoelectric conversion arrays are uniform when the light, with which the amount of light per unit wavelength becomes the same, is incident on the plurality of photoelectric conversion arrays.

10. A microparticle measurement device, comprising:
a microparticle measurement spectrometer including:
a spectroscopic element configured to disperse light emitted from microparticles flowing through a flow path, and
a photoelectric conversion array that has a plurality of light receiving elements having different detection wavelength ranges, wherein
the photoelectric conversion array is configured to convert optical information obtained by the light receiving elements into electrical information, and
outputs of all channels of the photoelectric conversion array are uniform when light, with which an amount of light per unit wavelength becomes same, is incident on the photoelectric conversion array.

11. A method for calibrating a microparticle measurement photoelectric conversion system, the method comprising:
receiving light emitted from microparticles flowing through a flow path with a plurality of light receiving elements having different detection wavelength ranges; and
converting optical information obtained by the plurality of light receiving elements into electrical information, wherein
outputs of all channels of the plurality of light receiving elements are uniform when light, with which an amount of light per unit wavelength becomes same, is incident on the plurality of light receiving elements.

12. The method for calibrating the microparticle measurement photoelectric conversion system according to claim 11, the method performing:
a minimum channel determination process of searching for a channel by which a photoelectric conversion gain becomes minimum; and
an independent gain adjustment process of adjusting an independent gain of each channel so that a photoelectric conversion gain of all channels becomes equivalent to a photoelectric conversion gain of a minimum channel, wherein
the outputs of all the channels of the plurality of light receiving elements are uniform when the light, with which the amount of light per unit wavelength becomes the same, is incident on the plurality of light receiving elements.

13. The method for calibrating the microparticle measurement photoelectric conversion system according to claim 11, wherein a total gain of the microparticle measurement photoelectric conversion system and an independent gain of each channel are calibrated to obtain a same measurement result as a microparticle measurement reference device, which is a reference.

14. The method for calibrating the microparticle measurement photoelectric conversion system according to claim 11, wherein
the microparticle measurement photoelectric conversion system has two or more microparticle measurement photoelectric conversion reference arrays, and
a total gain of the microparticle measurement photoelectric conversion array and an independent gain of each channel are calibrated to obtain a same measurement result as a microparticle measurement photoelectric conversion reference array, which is a reference.

15. The method for calibrating the microparticle measurement photoelectric conversion system according to claim 14, wherein the microparticle measurement photoelectric conversion reference array includes a microparticle measurement photoelectric conversion array with a minimum variation in characteristics between channels among all microparticle measurement photoelectric conversion arrays.

16. The method for calibrating the microparticle measurement photoelectric conversion system according to claim 15, the method performing:
a reference array calibration process of calibrating an independent gain of each channel so that outputs of all channels are uniform when the light with which the amount of light per unit wavelength becomes the same is incident regarding the microparticle measurement photoelectric conversion reference array; and
an independent gain setting process of setting an independent gain of each channel of a microparticle measurement photoelectric conversion array to be calibrated according to an independent gain of each channel after calibration of the microparticle measurement photoelectric conversion reference array.

17. The method for calibrating the microparticle measurement photoelectric conversion system according to claim 16, further performing:
an adjustment process of adjusting an output value of each channel using a correction coefficient on a basis of optical information from fluorescent reference particles emitting fluorescence of a predetermined wavelength range width flowing through the flow path.

* * * * *